(12) United States Patent
Luo et al.

(10) Patent No.: US 8,494,070 B2
(45) Date of Patent: Jul. 23, 2013

(54) CHANNEL IMPULSE RESPONSE (CIR)-BASED AND SECONDARY SYNCHRONIZATION CHANNEL (SSC)-BASED (FREQUENCY TRACKING LOOP (FTL)/TIME TRACKING LOOP (TTL)/CHANNEL ESTIMATION

(75) Inventors: Tao Luo, San Diego, CA (US); Yongbin Wei, San Diego, CA (US); Byoung-Hoon Kim, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 381 days.

(21) Appl. No.: 12/778,861

(22) Filed: May 12, 2010

(65) Prior Publication Data

US 2011/0280294 A1    Nov. 17, 2011

(51) Int. Cl.
*H04L 5/12* (2006.01)
(52) U.S. Cl.
USPC .......................................... 375/262; 375/224
(58) Field of Classification Search
USPC ................................................ 375/262, 224
See application file for complete search history.

(56) References Cited

U.S. PATENT DOCUMENTS

| | | | |
|---|---|---|---|
| 7,092,459 B2* | 8/2006 | Sendonaris | 375/326 |
| 7,457,231 B2* | 11/2008 | Vijayan et al. | 370/208 |
| 2002/0101840 A1* | 8/2002 | Davidsson et al. | 370/330 |
| 2003/0054768 A1* | 3/2003 | Challa et al. | 455/63 |
| 2004/0004962 A1* | 1/2004 | Glazko et al. | 370/375 |
| 2006/0233097 A1* | 10/2006 | Vrcelj et al. | 370/208 |
| 2009/0129511 A1 | 5/2009 | Vijayan et al. | |
| 2009/0196274 A1* | 8/2009 | Rimini et al. | 370/344 |
| 2009/0323843 A1 | 12/2009 | Yang et al. | |
| 2010/0027692 A1* | 2/2010 | Kent | 375/260 |
| 2011/0007694 A1* | 1/2011 | Kim et al. | 370/329 |
| 2011/0158342 A1* | 6/2011 | Srinivasan et al. | 375/285 |

OTHER PUBLICATIONS

International Search Report—PCT/US2011/036319—ISA/EPO—Nov. 15, 2011.
Written Opinion—PCT/US2011/036319, International Search Authority, European Patent Office, Nov. 15, 2011.

* cited by examiner

*Primary Examiner* — Juan A Torres
(74) *Attorney, Agent, or Firm* — Larry J. Moskowitz

(57) ABSTRACT

Methods and systems are disclosed for channel estimation and frequency tracking in mobile communication systems. Particularly, various ways of using the time domain impulse channel response based on the staggered frequency domain pilot tones are presented that enable rapid frequency error estimation and frequency tracking control. A mathematical model is developed that provides a convenient metric for evaluating tolerable frequency error, as well as modes for switching between channel impulse response (CIR)-based and secondary synchronization channel (SSC)-based frequency tracking.

42 Claims, 17 Drawing Sheets

CHANNEL IMPULSE RESPONSE (CIR)-BASED AND SECONDARY SYNCHRONIZATION CHANNEL (SSC)-BASED (FREQUENCY TRACKING LOOP (FTL)/TIME TRACKING LOOP (TTL)/CHANNEL ESTIMATION

BACKGROUND

1. Field

This disclosure is related to wireless communication systems. More particularly, this disclosure is related to systems and methods for providing improved management of the frequency tracking loop logic/control for mobile systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

The present disclosure contains descriptions relating to coordinating multiple systems for increased downlink data processing.

In one of various aspects of the disclosure, a method for channel estimation using received reference signal (RS) tones in a mobile communications system is provided, comprising: generating frequency domain response expressions (H) for at least one or more sets of RS tones in a communication channel; derotating H by a complex conjugate of the RS tones; combining the frequency domain response expressions to form a staggered frequency domain response expression ($H_{a,b}$) of the one or more sets of RS tones; grouping terms of the staggered frequency domain response expression into desired signals $A(f_e)$ and phase signals $B(d,f_e)$, where $f_e$ represents frequency error and d represents a number of chips between RS tones; converting the staggered frequency domain response expression into a time domain expression ($h_{a,b}$); generating an error function $Z(f_e)$ from the time domain expression ($h_{a,b}$) by applying a cross product between different pairs of RS tone groups ($H_{a,b}$, $H_{b,c}$, etc.) and summing terms; estimating a frequency error $f_e$ from the error function $Z(f_e)$; and adjusting a discriminator in a mobile device based on the estimated frequency error for enhanced frequency tracking.

In another aspect of the disclosure, an apparatus for channel estimation using received reference signal (RS) tones in a mobile communications system is provided, comprising: means for generating frequency domain response expressions (H) for at least one or more sets of RS tones in a communication channel; means for derotating H by a complex conjugate of the RS tones; means for combining the frequency domain response expressions to form a staggered frequency domain response expression ($H_{a,b}$) of the one or more sets of RS tones; means for grouping terms of the staggered frequency domain response expression into desired signals $A(f_e)$ and phase signals $B(d,f_e)$, where $f_e$ represents frequency error and d represents a number of chips between RS tones; means for converting the staggered frequency domain response expression into a time domain expression ($h_{a,b}$); means for generating an error function $Z(f_e)$ from the time domain expression ($h_{a,b}$) by applying a cross product between different pairs of RS tone groups ($H_{a,b}$, $H_{b,c}$, etc.) and summing terms; means for estimating a frequency error $f_e$ from the error function $Z(f_e)$; and means for adjusting a discriminator in a mobile device based on the estimated frequency error for enhanced frequency tracking.

In another aspect of the disclosure, a computer program product is provided, comprising: a computer-readable medium comprising: code for generating frequency domain response expressions (H) for at least one or more sets of reference signal (RS) tones received in a communication channel in a mobile communications system for channel estimation; code for derotating H by a complex conjugate of the RS tones: code for combining the frequency domain response expressions to form a staggered frequency domain response expression ($H_{a,b}$) of the one or more sets of RS tones; code for grouping terms of the staggered frequency domain response expression into desired signals $A(f_e)$ and phase signals $B(d, f_e)$, where $f_e$ represents frequency error and d represents a number of chips between RS tones; code for converting the staggered frequency domain response expression into a time domain expression ($h_{a,b}$); code for generating an error function $Z(f_e)$ from the time domain expression ($h_{a,b}$) by applying a cross product between different pairs of RS tone groups ($H_{a,b}$, $H_{b,c}$, etc.) and summing terms; code for estimating a frequency error $f_e$ from the error function $Z(f_e)$; and code for adjusting a discriminator in a mobile device based on the estimated frequency error for enhanced frequency tracking.

In yet another aspect of the disclosure, an apparatus for channel estimation using received reference signal (RS) tones in a mobile communications system is provided, comprising: a processor, configured to control operations for: generating frequency domain response expressions (H) for at least one or more sets of RS tones in a communication channel; derotating H by a complex conjugate of the RS tones: combining the frequency domain response expressions to form a staggered frequency domain response expression ($H_{a,b}$) of the one or more sets of RS tones; grouping terms of the staggered frequency domain response expression into desired signals $A(f_e)$ and phase signals $B(d,f_e)$, where $f_e$ represents frequency error and d represents a number of chips between RS tones; converting the staggered frequency domain response expression into a time domain expression ($h_{a,b}$); generating an error function $Z(f_e)$ from the time domain expression ($h_{a,b}$) by applying a cross product between different pairs of RS tone groups ($H_{a,b}$, $H_{b,c}$, etc.) and summing terms; estimating a frequency error $f_e$ from the error function $Z(f_e)$; adjusting a discriminator in a mobile device based on the estimated frequency error for enhanced frequency tracking; and a memory coupled to the processor for storing data.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
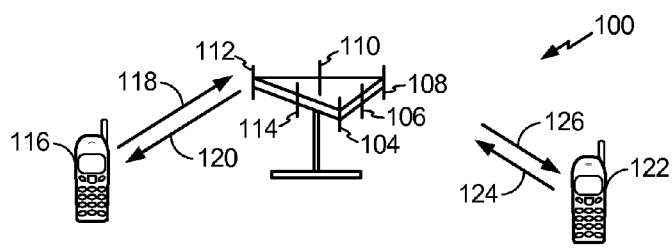
FIG. 1 illustrates a multiple access wireless communication system according to one embodiment.

For the purposes of the present document, the following abbreviations apply, unless otherwise noted:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
ECI Extended Channel Information
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PBCCH Primary Broadcast Control CHannel
PBCH Physical Broadcast CHannel
PCCH Paging Control CHannel
PCH Paging CHannel
PDU Protocol Data Unit
PHY PHYsical layer
PhyCH Physical CHannels
QPCH Quick Paging CHannel
RACH Random Access CHannel
RLC Radio Link Control
RRC Radio Resource Control
SAP Service Access Point
SBCCH Secondary Broadcast Control CH
SDU Service Data Unit
SHCCH SHared channel Control CHannel
SN Sequence Number
SSCH Shared Signaling CHannel
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast Broadcast Single Frequency Network
MCE MBMS Coordinating Entity
MCH Multicast CHannel
DL-SCH Downlink Shared CHannel
MSCH MBMS Control CHannel
PDCCH Physical Downlink Control CHannel
PDSCH Physical Downlink Shared CHannel The techniques described herein may be used, depending on implementation specifics, for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

INTRODUCTION

Single carrier frequency division multiple access (SC-FDMA), which utilizes single carrier modulation and frequency domain equalization is a wireless communication technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, or some other terminology. An access terminal may also be called an user equipment (UE), a wireless communication device, terminal, access terminal or some other terminology.

Figure 2:
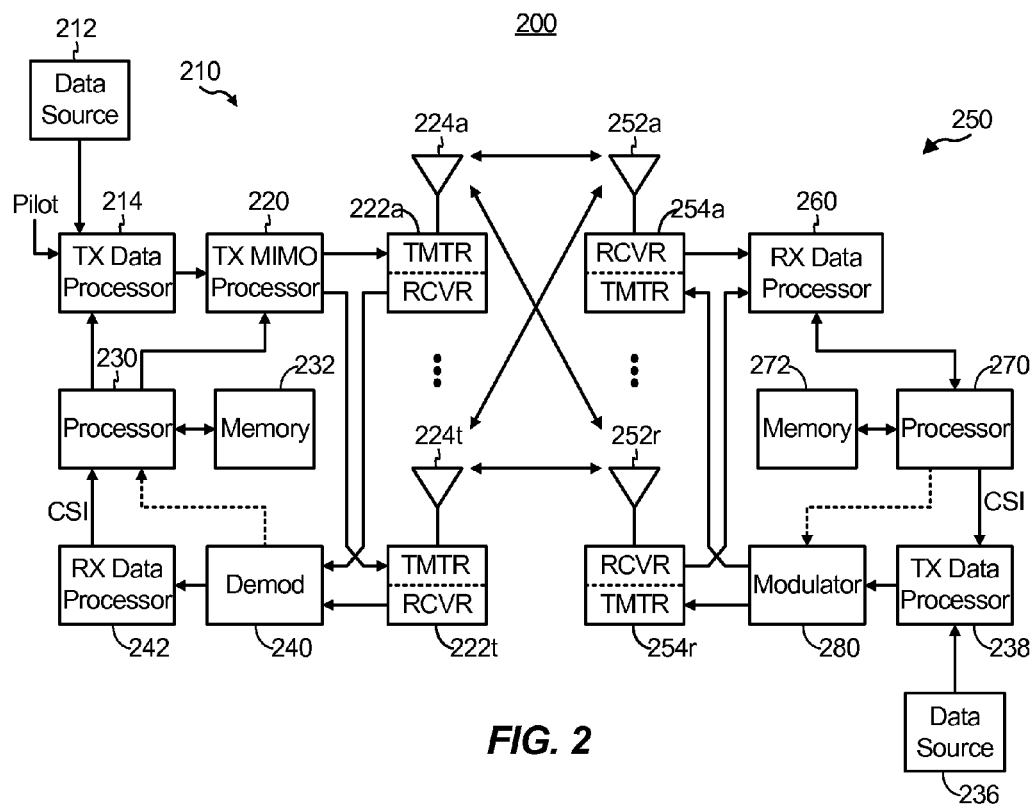
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to transmit (TX) data processor 214.

In an embodiment, each data stream is transmitted over a respective transmit antenna or antenna group. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, M-QAM, or so forth) selected for that data stream to provide modulation symbols. The data rate, coding, and modulation for each data stream may be determined by instructions performed by processor 230 which may have memory 232 attached.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. The processor 270 may be coupled to supporting memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Figure 3:
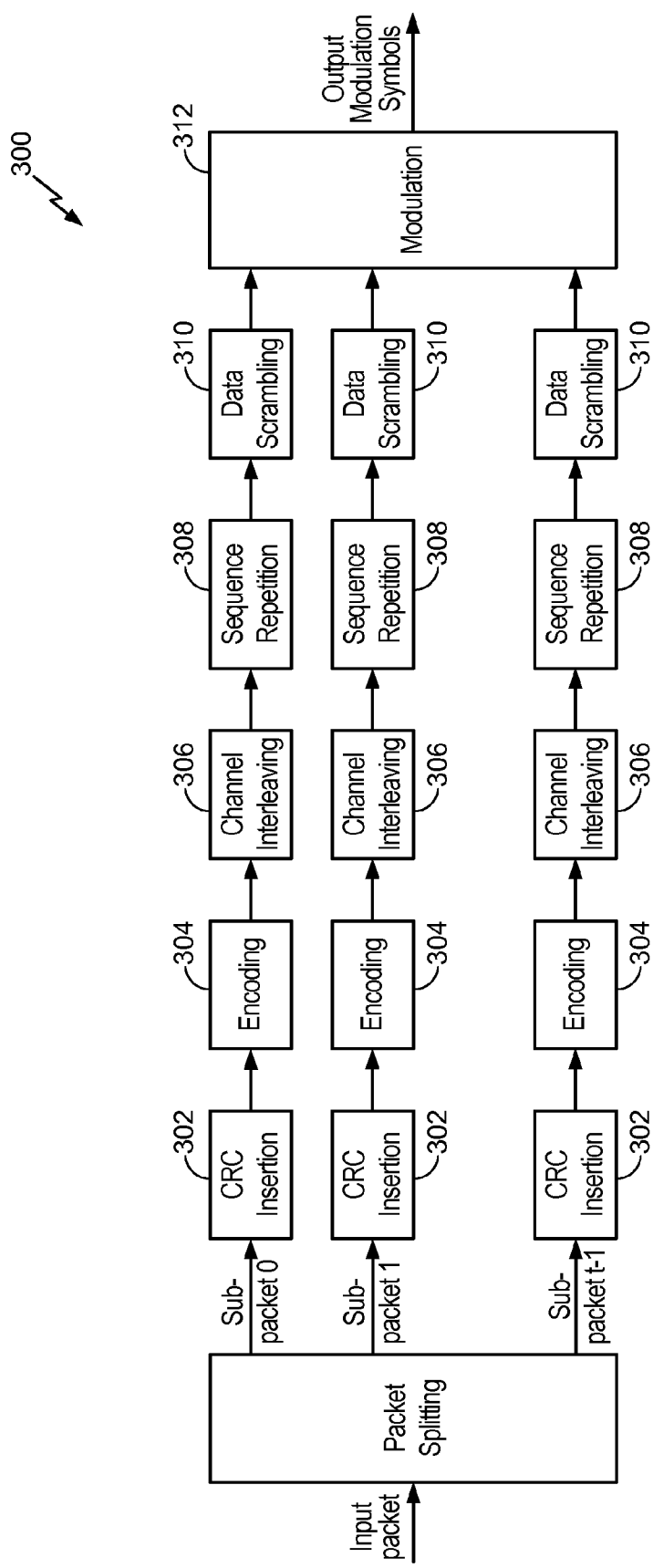
FIG. 3 is a block diagram of a transmission architecture for arranging packets of data.

FIG. 3 depicts and exemplary transmitting architecture 300. As suggested in FIG. 3, a packet of information can be split into a number of sub-packets $\{0, 1, 2, \ldots t-1\}$ with each sub-packet receiving a CRC checksum 302, then undergoing a number of standard processes, such as encoding 304, interleaving 306, sequence repetition 308 and scrambling 310. The resultant processed sub-packets may then be combined into a larger architecture (described further below), then modulated 312 and transmitted according to an OFDM scheme, and according to a temporal architecture of frames and super-frames, such as shown in FIG. 4.

Figure 4:
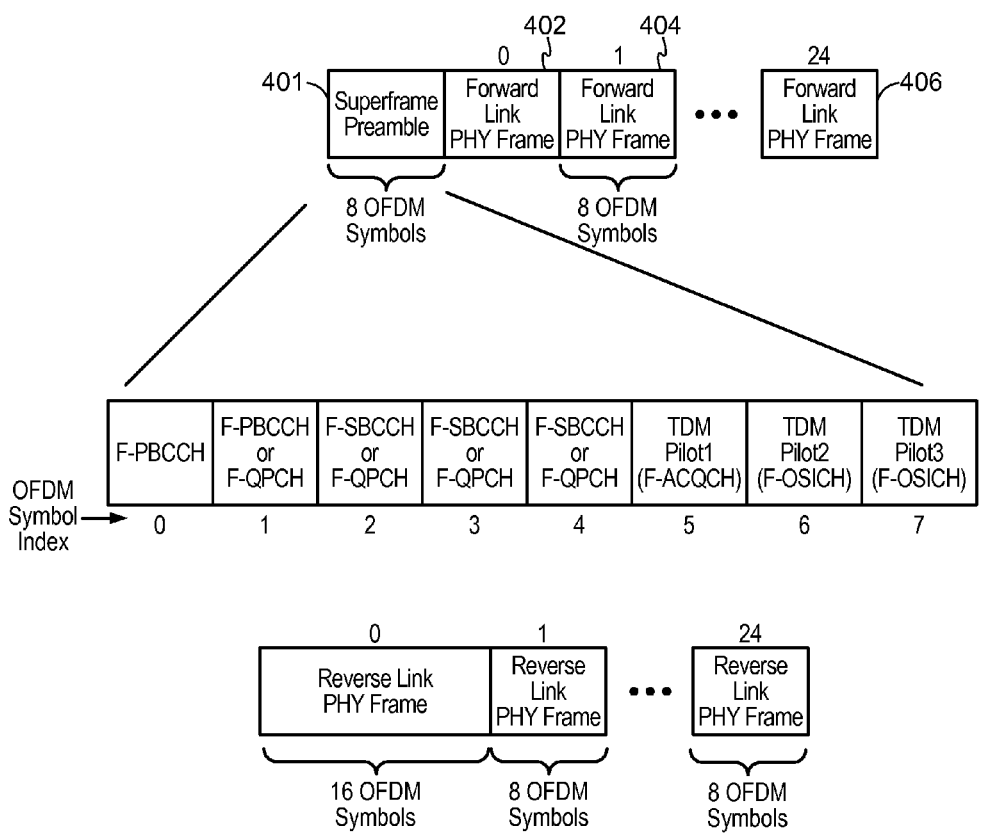
FIG. 4 is an illustration of an exemplary frame/super-frame transmission architecture.

FIG. 4 depicts a frame arrangement suitable for OFDM showing packet/sub-packet sequencing for the forward and reverse link. The sequencing at the upper part of FIG. 4 shows a series of sub-packets 402, 404, and 406 appended to the forward link Superframe Preamble 401. For various blocks of data in a frame/super-frame architecture, OFDM signals and data may be organized into sub-blocks, called "tiles" for the purposes of this disclosure. Each of the sub-packets will have an OFDM-to-Tone tile structure similar to that shown in FIG. 5—with one or more tiles being associated to different users in the sector and/or network.

Figure 5:
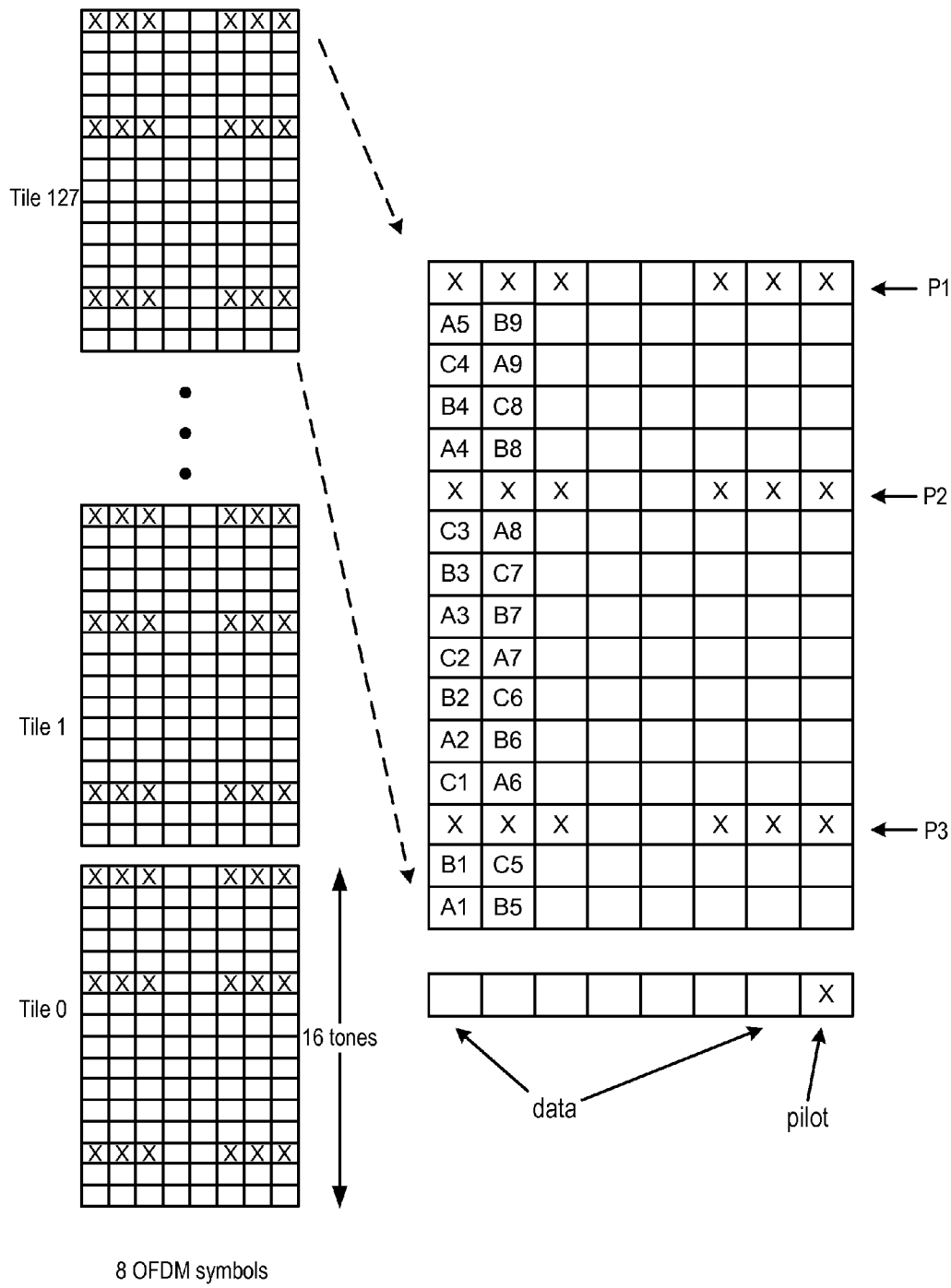
FIG. 5 is a depiction of an arrangement of OFDM data/pilot tones in a tile structure.

FIG. 5 shows an example of an OFDM signal broken into 128 tiles with each tile being made from 16 separate tones (or sub-channels) over 8 OFDM symbols such that each tile may comprise as many as 128 symbols. The format of FIG. 5 shows an OFDM physical layer that provides a 3-D time-frequency-space grid that may be used according to a Block Hopping Mode where some of these tiles may are assigned to an AT.

As shown in FIG. 5, each of the various tiles can have both data symbols (designated by the indexed A, B, C's) and pilot symbols (designated by the X's), with data symbols being used to carry information and pilot symbols being used to perform a wide variety of tasks, some of which may be explained further below noting that an orthogonal pilot sequence from an AP Tx antenna can allow channel and interference estimation per layer. Non-pilot symbols can be occupied by Data from several subpackets where symbols from a subset of subpackets are "painted" on non-pilot tones in a round-robin fashion across one or more tiles.

Depending on a desired assignment of tiles to data, payload data may be effectively arranged. For example, in FIG. 5 tile 127 is shown as having been assigned to hold three sub-packets of information $\{A, B, C\}$ with sub-packet $\{A\}$ containing data symbols $(A_0, A_1, A_2, A_3, \ldots)$, sub-packet $\{B\}$ containing data symbols $(B_0, B_1, B_2, B_3, \ldots)$, and sub-packet $\{C\}$ containing data symbols $(C_0, C_1, C_2, C_3, \ldots)$. Note that the various symbols are interspersed together in a process/format that may be referred to as "painting." Painting patterns allow for pipelining of Demod and Decode operations for different sub-packets. Pilot tones indicated by P1, P2, P3, etc. are shown interspersed about the tiles. The significance of the Pilot tones and their arrangement will be made evident below.

Figure 6:
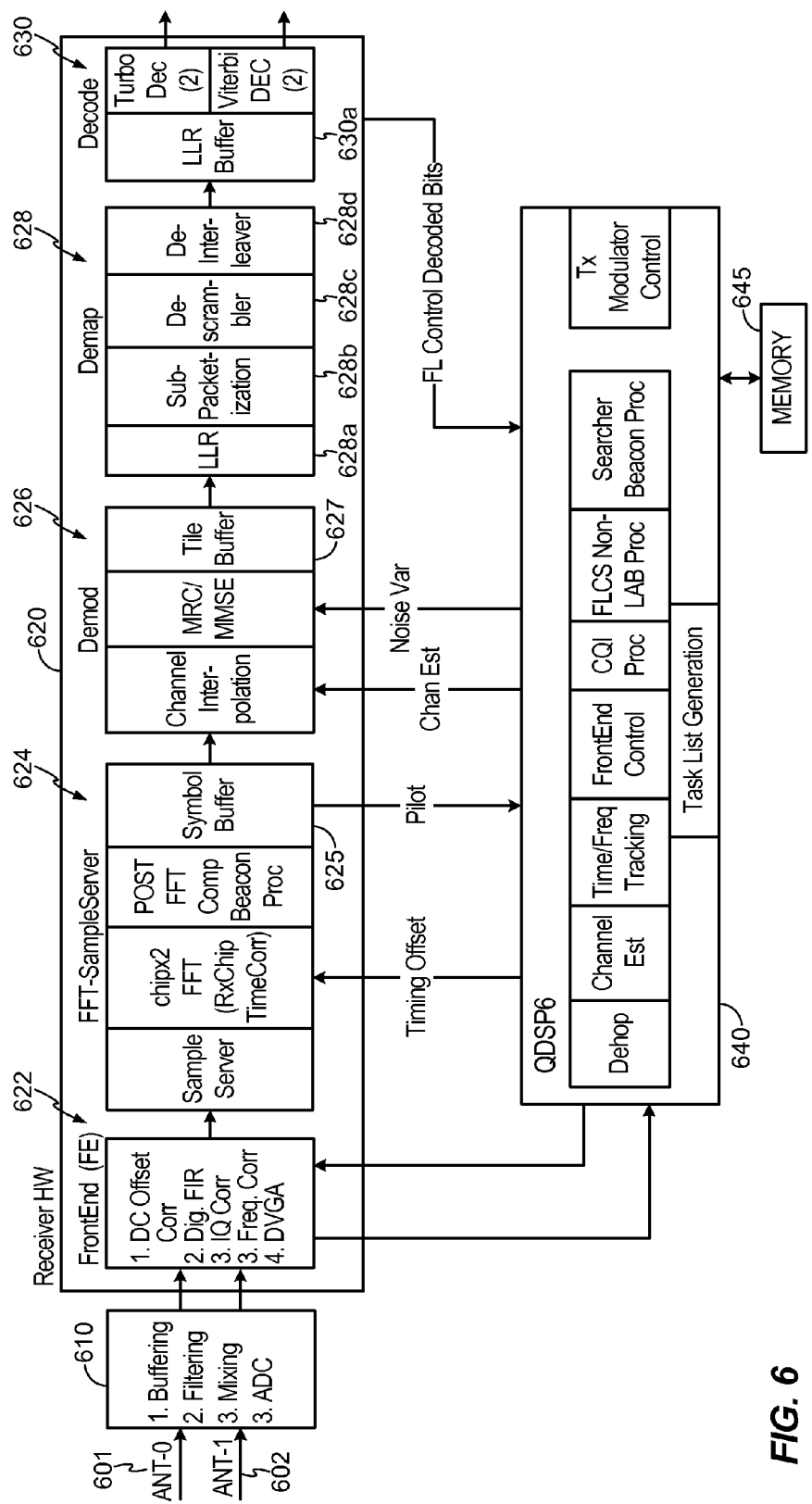
FIG. 6 is a block diagram of an exemplary hardware receiver architecture with supporting processor.

FIG. 6 depicts an exemplary hardware receiver architecture with supporting processor. As shown in FIG. 6, two antennas ANT-0 601 and ANT-1 602 lead to an analog front-end 610, which may perform various processes on the received signals, such as buffering, filtering, mixing and analog to digital conversion to provide two streams of digitized data to a digital front-end 622 of the receiver hardware 620 architecture. Note that each antenna 601, 602 may receive multiple signals from multiple ATs with each AT having one or more antennas and being able to transmit multiple data channels. Accordingly, the analog front-end 610 and receiver hardware 620 can be designed to provide for any and all such received channels. It should be understood that while FIG. 6 illustrates antennas 601, 602, more or less antennas may be used according to the specifics of implementation.

Once received, processed and digitized, the digitized data may be processed according to a number of desirable processes, such as DC offset correction, digital filtering, I/Q correction, frequency correction, digital gain control, and so forth in digital front-end 622. The digital front-end 622 may then provide the digitally processed data as data streams to the fast Fourier transform (FFT) sample server/engine 624.

The FFT sample server 624 can be designed to buffer data received from the digital front-end 622, then perform FFT operations on the data streams noting that (for multiple data streams) each stream can be processed independently from one another to the degree that FFT sizes can be independent and post-FFT processing can also be handled independently such that time offsets and filter distortion may be independently handled. For example, if two concurrent data streams are received with the first stream received with a 1 micro-second offset and the second received with a 5 micro-second offset, then post-FFT processing may be provided such that each offset is correctly accounted/corrected. Note that the FFF sample server 624, like the rest of the various modules in the receiver hardware 620, may be dynamically configured under control of a processor designated here as a Model QDSP6 640, which may be any form of sequential instruction processing machine executing software/firmware, having either on board or off board memory (not shown). Therefore, other processors than the QDSP6 640 may be used according to design preference. Coupled to the processor 640 is optional memory 645, for storing data/instructions, and so forth. In some processors, the memory 645 may be contained on the processor, rather than off the processor.

Continuing, post-FFT corrected data may then be stored in an FFT symbol buffer 625, which may then be provided to the Demod engine 626, which may perform any number of demodulation operations, such as MMSE or MRC operations, to produce demodulated outputs with each output arranged logically in a manner consistent with the tiles of FIG. 5. Note that each entry of each tile may include three components including a real portion (I), a complex portion (Q) and a related SNR. Demodulated data may then be stored in the Tile Buffer 627, and may be further processed by Demap Engine 628, that includes blocks 628a to 628d, and Demap Engine, that includes block 630a.

Pilot Tones—CIR based FTL

Referring back to FIG. 5, the pilot tones are understood to be reference signals (RS) having a "known" frequency and "known" time sequencing that the AP is transmitting to the AT or UE. By using these "known" RS/pilot tones, the characteristics of the channel being transmitted can be estimated by the UE. Based on information from the estimated or determined channel characteristics, the symbols detected in the data can be better evaluated for accuracy.

In an E-UTRA system, for example, the RS/pilot tones are sent at a fraction of the overall time/frequency domain of operation. The RS tones and data tones are multiplexed in the frequency domain, and the RS tones are sent at a fraction of the transmission time, i.e., only a fraction of symbols sent actually contain RS tones. One way to estimate the channel characteristics is to stagger those adjacent pilot tones in the frequency domain and estimate the time domain (or, raw Channel Impulse Response (CIR)) based on the staggered frequency domain pilot tones. The resulting channel estimate may be further filtered in time or frequency domain to reduce the impact of noise and interference (filtered CIR).

The above approach(es) presumes that the UE's receiver is in frequency sync with the AP's transmitter. However, it is well known that the frequency clocks in the UE may not be as accurate as the transmitting AP's clock (either being of inferior quality and/or subject to different conditions from that of the AP, and so forth). Therefore, there will always be some drift between the AP's frequencies and the corresponding UE's frequencies when assessing the received reference signals/pilot tones. This difference results in frequency error on the UE side. To mitigate this, virtually all UE systems utilize a frequency tracking loop (FTL) that tries to stabilize the UE's receiver frequency to that of the AP's.

Based on the use of pilot tones or RS tones in a transmitted packet, the following describes various approaches to concisely quantify the frequency error and its effect on the FTL process. Methods and systems will be presented that allow for more accurate FTL use and reduced data errors.

Figure 7:
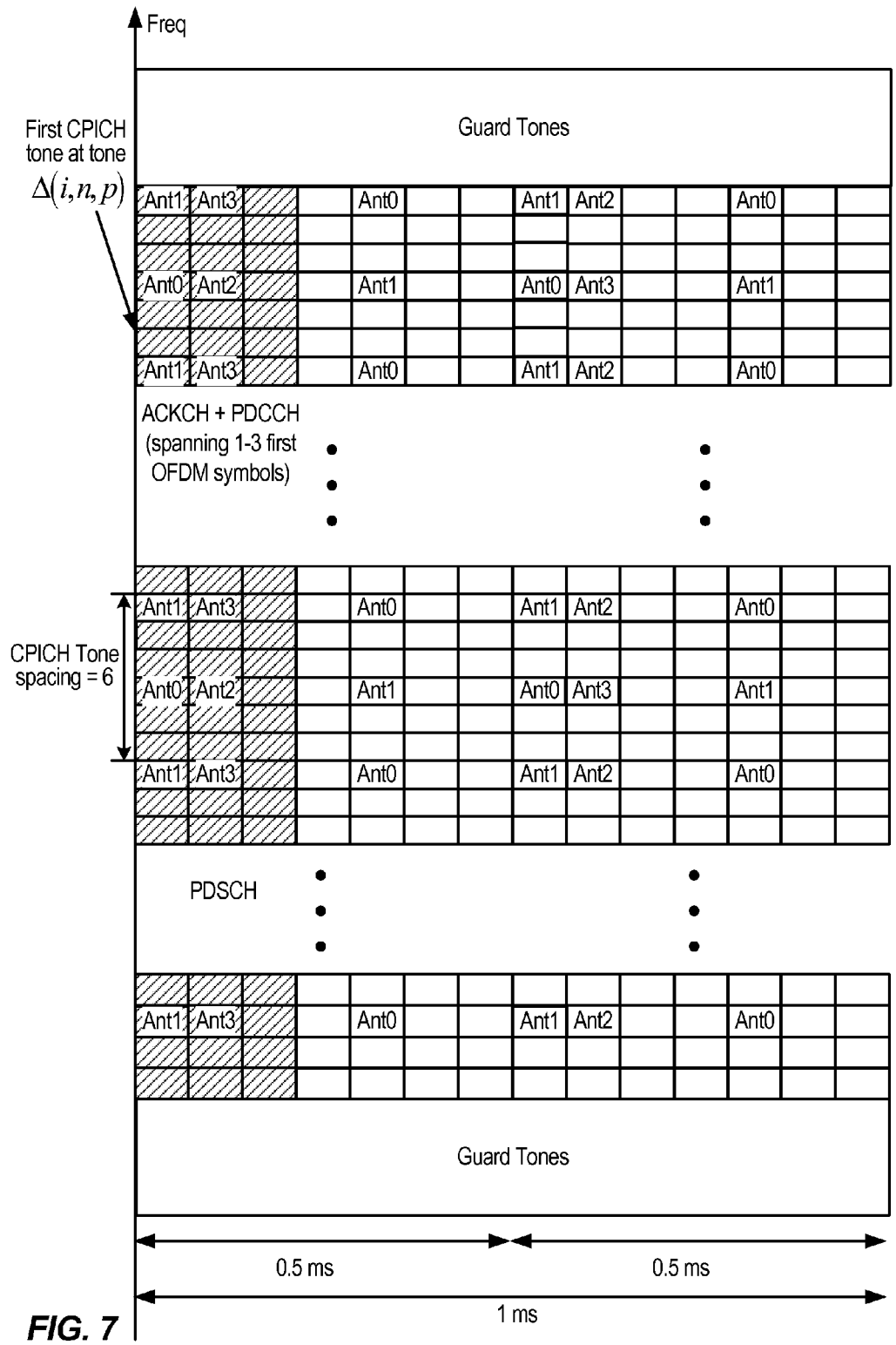
FIG. 7 is a depiction of RS-tones staggered in OFDM tile structure.

FIG. 7 is a more detailed illustration of the tile structure shown in FIG. 5, having a normal length CP. The preamble (comprising in this instance, 3 tones) is placed at the fore of the tiles and have a leading pair of RS tones (signified by the ANT0-ANT3 nomenclature) that are adjacent to each other. After the preamble, the RS tones are distributed through the data portion of the sub-frame in a staggered pattern, as will be discussed below. While the RS tones throughout the sub-frame are designated as originating from four antennas (ANT0-ANT3), it should be understood that more or less "antennas" may be used, without departing from the spirit and scope herein. The staggering of the RS tones can be used to evaluate the frequency error by "stacking" earlier with later (or vice versa) staggered RS tones to see if they overlap. If there is frequency error in the UE, then the RS tones will not overlap exactly.

Figure 8:
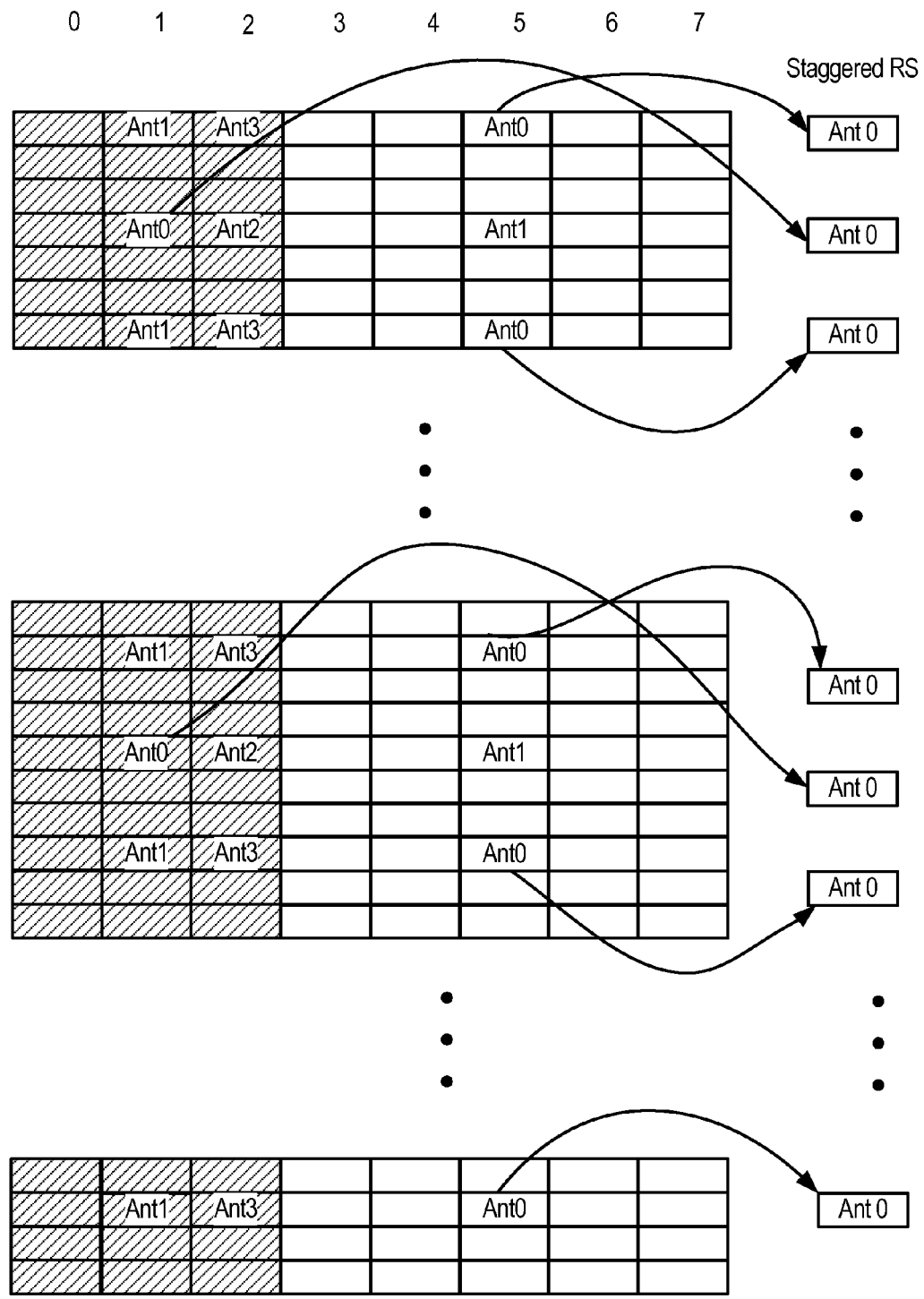
FIG. 8 is a depiction of FIG. 7's RS-tones showing the arrangement for the Ant0 tone.

FIG. 8 illustrates the staggering of the RS tones within the tile structure both in time and frequency. However, there is a uniform frequency staggering for given RS tones, as indicated, for example, by the ANT0 sequence displayed at the right of FIG. 8.

Figure 9:
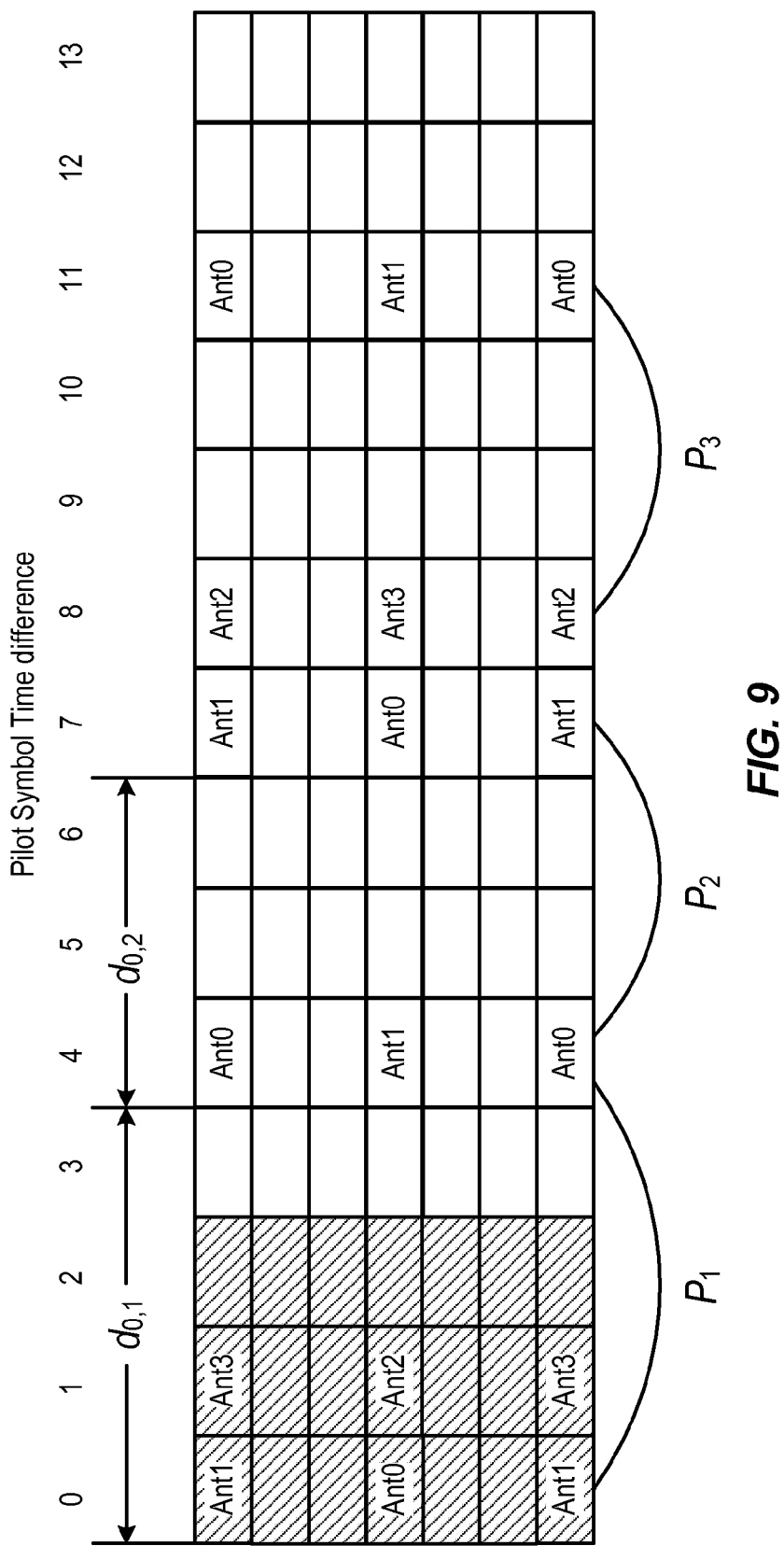
FIG. 9 is a depiction of pilot time differences.

FIG. 9 illustrates the staggering of the RS tones within a subframe. The RS tones are shown having fixed time staggering intervals. For example, starting at column number 0, ANT0's tone is found at time column indices 0, 4, 7 and 11. Similarly, ANT1's tone pattern is only found at time column indices 0, 4, 7, and 11. While, ANT2's tone pattern is found at time column indices 1 and 8. And ANT3's tone pattern is also found at time column indices 1 and 8. (It should be noted that the time columns can extend beyond column 13).

Looking at the time staggering of only the ANT0 tones, the pair formed by the $1^{st}$ and $2^{nd}$ ANT0 tones is denoted as $P_1$, the pair formed by the $2^{nd}$ and $3^{rd}$ ANT0 tones is denoted as P2, and the pair formed by the $3^{rd}$ and $4^{th}$ ANT0 tones is denoted as P3. Therefore, three pairs of RS tones are staggered in the sub-frame shown in FIG. 9—$P_1$, $P_2$, and $P_3$. The relative time "distance" between the $1^{st}$ ANT0 tone and the $2^{nd}$ ANT0 tone is indicated by the symbol $d_{0,1}$ (noting here that the indices start with 0 as the first index rather than 1). The relative time "distance" between the $2^{nd}$ ANT0 tone and the $3^{rd}$ ANT0 tone is indicated by the symbol $d_{1,2}$, and so forth. Comparing the pairing with the time differences, it is noted that pairs P1 and P3 share the same time difference $d_{0,1}$ while P2 has the time difference $d_{1,2}$.

Due to the time difference between the staggered RS pairs (P1 or P3 versus P2, for example), there will arise a periodic phase modulation in the frequency domain if a frequency offset or error exists. Consequently, for sequences using pilot pseudo random sequencing (PRS), this frequency error will reduce the number of time domain channel "taps" that are suitable for estimating the frequency offset needed for correction. Also, it is known that the phase of the differential product between (P1, P2) is a function of the frequency error. Similarly, the phase of the differential product between (P2, P3) will also be a function of the frequency error. Therefore, by evaluating the phases, a good estimation of the frequency error can be obtained and more accurate FTL measures can be used. To quantify this, a mathematical system model is expressed below.

Mathematical System Model

Suppose the FFT size for OFDM is N, then the time domain waveform s(n) of an OFDM symbol can be expressed as $$s(n) = \frac{1}{\sqrt{N}} \sum_{k=0}^{N-1} \sqrt{E}\, S[k] \cdot e^{j2\pi kn/N},$$

where n=0, 1, . . . , N−1 and is the time domain index, k is the frequency domain index, and E is energy per symbol.

Defining the channel discrete frequency response as H[k] with k=0, 1, . . . , N−1, the received signal in the time domain r(n), after removing the CP, is $$r(n) = \frac{1}{\sqrt{N}} \sum_{k=0}^{N-1} \sqrt{E}\, S[k] \cdot H[k] \cdot e^{j2\pi kn/N} + v(n),$$

where n=0, 1, . . . , N−1 and v(n) represents the noise.

Presuming a frequency error $f_e$ is evident in the signal, where $f_e$ is normalized relative to the tone spacing (7.5 kHz or 15 kHz as in E-UTRA, for example), the resulting signal can be expressed as $$r(n) = \frac{1}{\sqrt{N}} \sum_{k=0}^{N-1} \sqrt{E}\, S[k] \cdot H[k] \cdot e^{j2\pi(k+f_e)n/N} + v(n)$$

Applying an FFT to the received signal and deroates (multiplied by the pilot sequence so modulation from pilot sequence is removed) the signal by the pilot signal, the resulting frequency domain received signal R[k] for pilot tone index k is $$R[k] = \frac{S[k]^*}{\sqrt{N}} \sum_{n=0}^{N-1} r(n) e^{-j2\pi kn/N} \qquad (1)$$

-continued $$= \underbrace{\frac{\sqrt{E}}{N} H[k] \sum_{n=0}^{N-1} e^{j2\pi f_e n/N}}_{\text{Desired signal}} +$$

$$\underbrace{\frac{\sqrt{E}}{N} \sum_{\substack{m=0 \\ m \neq k}}^{N-1} S[m]S^*[k]H[m] \cdot \frac{1-e^{j2\pi(f_{err})}}{1-e^{j2\pi(m-k+f_{err})/N}}}_{\text{Inter-tone interference}} +$$

$$\underbrace{\tilde{v}[k]}_{\text{Filtered noise}}$$

$$= \underbrace{H[k]A(f_e)}_{\text{Desired signal}} + \underbrace{I(k, f_e)}_{\text{Interference + Noise}}$$

where $$A(f_e) = \frac{1}{N} \sum_{n=0}^{N-1} \sqrt{E}\, e^{j2\pi f_e n/N}.$$

From Eq. (1), it can be observed that frequency error $f_e$ reduces the desired signal strength and increases the interference level. By using the first two terms of the Taylor series expansion of $e^{j2\pi f_e t}$, i.e., $e^{j2\pi f_e t} \approx 1-j2\pi f_e t$, i.e., it can be shown that the energy loss $\epsilon_e$ in the desired signal can be approximated as $$\varepsilon_e \approx 1 - \frac{\pi^2}{3}(f_e)^2$$

and the resulting energy $\epsilon_{ITI}$ of the inter-tone interference expression can be normalized to the desired signal as approximately $$\varepsilon_{ITI} \approx \frac{(2\pi f_e)^2}{12}.$$

Therefore, the energy loss or gain ($\epsilon_e$ or $\epsilon_{ITI}$) from the frequency error $f_e$ can be easily calculated with the above simplified expressions.

Numerical Examples (Tone Spacing 15 KHz):

Using a tone spacing of 15 kHz with a known 1 kHz error, the frequency error can be expressed as the ratio of the error over the spacing:

$$f_e = \frac{1}{15} \approx 0.067.$$

Therefore, using the above energy formulas for a 1 kHz frequency error, the energy loss $\epsilon_e$ is 0.0643 dB and the inter-tone interference energy $\epsilon_{ITI}$ is ~18 dB below the desired signal. For an error of 500 Hz with a tone spacing of 15 kHz, the frequency error energy loss $\epsilon_e$ is 0.02 dB and inter-tone interference energy $\epsilon_{ITI}$ is ~24 dB below the desired signal.

Frequency Error Impact on the Staggered RS

Defining a phase ramping function B as a function of the number of chips d (including CP and other relevant parts) and frequency error $f_e$ as $B(d, f_e) = e^{j 2 \pi d f_e/N}$, between two pilot symbols (RS) having a pairing equivalent to $P_1$ between ANT0 RS tones (as shown in FIG. 7, for example), Eq. (1) can be applied. It is noted here that if there is no frequency error, then B will simply reduce to 1.

The receiver's frequency domain response $H_0$ of the 1st RS symbol (remembering that the $1^{st}$ symbol has the index of 0) is $$H_0 = \begin{bmatrix} H[0]A(f_e) \\ H[6]A(f_e) \\ H[12]A(f_e) \\ \vdots \\ H[6(N_p - 1)]A(f_e) \end{bmatrix},$$

where $N_p$ is the number of RS tones per OFDM symbol per antenna. The above expression assumes that there is an RS tone at every $6^{th}$ interval.

For the receiver's frequency domain response $H_1$ of the 2nd RS symbol (remembering that the $2^{nd}$ symbol has the index of 1) the result is $$H_1 = \begin{bmatrix} H[3]A(f_e)B(d_{0,1}, f_e) \\ H[9]A(f_e)B(d_{0,1}, f_e) \\ H[15]A(f_e)B(d_{0,1}, f_e) \\ \vdots \\ H[6(N_p - 1) + 3]A(f_e)B(d_{0,1}, f_e) \end{bmatrix}.$$

The above expression assumes that there is an RS tone at the 3, 9, 15 and so forth intervals. Now overlapping or staggering $H_0$ and $H_1$, results in $$H_{0,1} = [H[0]A(f_e), H[3]A(f_e)B(d_{0,1}, f_e), H[6]A(f_e),$$

$$H[9]A(f_e)B(d_{0,1}, f_e) \ldots]^T =$$

$$\underbrace{[H[0]A(f_e), H[3]A(f_e), H[6]A(f_e), H[9]A(f_e) \ldots]^T}_{Q_1} \Theta$$

$$\underbrace{[1, B(d_{0,1}, f_e), 1, B_0(d_{0,1}, f_e), \ldots]^T}_{Q_2}$$

where $\Theta$ represents the dot product operator. $Q_1$ is equivalent to the time domain channel impulse response (CIR). Regarding $Q_2$, applying an inverse discrete Fourier transform (IDFT/IFFT) with an time index of size M, with $Q_1$ padded with $M-2N_p$ zeros and $Q_2$ periodically extended to length M, the IDFT/IFFT ($q_2$) of $Q_2$ becomes $$q_2[n] = \begin{cases} \frac{\sqrt{M}}{2}(1 + B(d_{0,1}, f_e)) & n = 0 \\ \frac{\sqrt{M}}{2}(1 - B(d_{0,1}, f_e)) & n = \frac{M}{2} \\ 0 & \text{else,} \end{cases}$$

where n is the time index. It is noted that the first relationship expresses the desired signal with accompanying error contribution which is seen when n=0, the second relationship expresses the desired signal with accompanying error contribution which is seen at the image point (half of the IDFT/IFFT size: n=M/2), and the third relation expresses the desired signal with accompanying error at all other n values.

Thus, the IDFT/IFFT of the staggered RS tone $H_{01}$ can be expressed as a convolution of two functions:
- IDFT/IFFT of $Q_1$: i.e., proportional to time domain channel impulse response (CIR); and
- IDFT/IFFT of $Q_2$: two delta functions at time 0 and the middle, i.e., M/2.

Some observations are as follows.

There will be a pilot tone (RS) processing gain of $2N_p$ if there is no frequency error.

The second delta function generates a scaled image of the original CIR with a time shift M/2.

If three orthogonal sequences are used on top of the RS PRS, those images will cause interference to the desired CIR.

Figure 10:
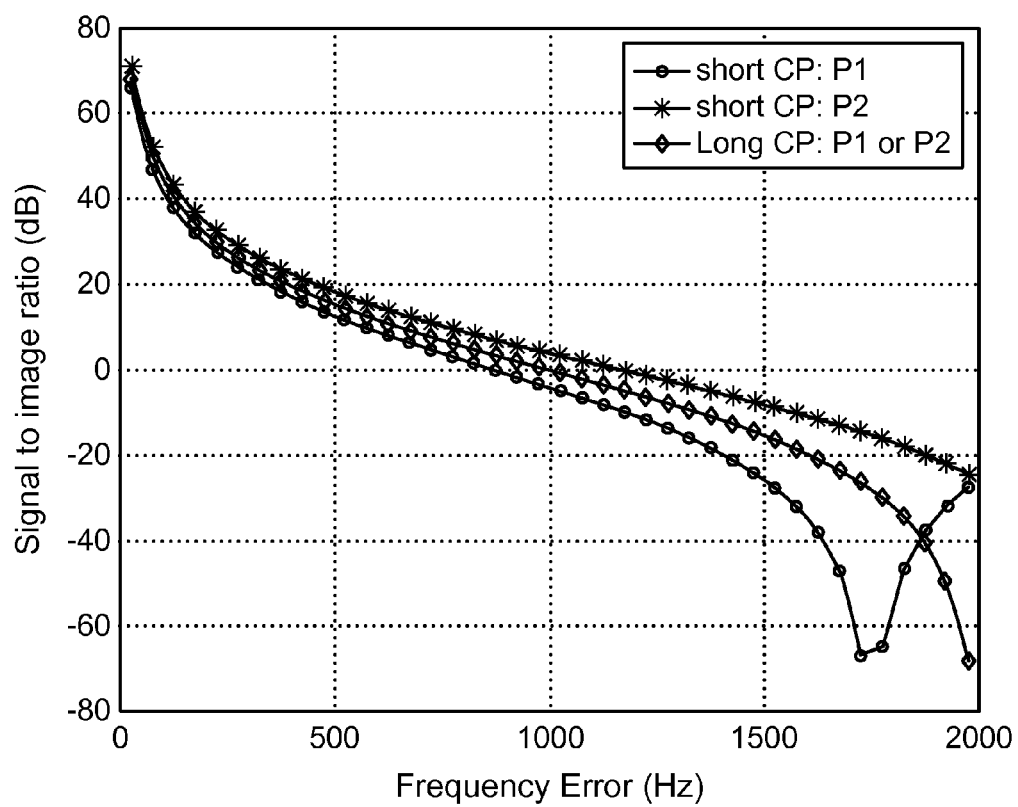
FIG. 10 is a plot comparing signal to image ratios for various RS pairings.

Based on the above analysis a simulation was performed for different frequency error values. FIG. 10 shows the results of the simulation with the relative strength of the ratio of the signal and its image, for differing CP lengths and RS pairs (P1 & P2). At the frequency error=0 value, the signal to image signal ratio is very high. It is noted that when the ratio crosses the dB=0 point, the desired signal and the image signal are of equal strength which means that the FTL will not be reliable. Examining FIG. 10 it is observed that a 1 kHz error gives a very large image, and beyond 1 KHz the image becomes larger than the desired signal. Also, it is noted that for the P1 pairing, it has a smaller pull-in range (e.g., tone spacing) as compared to P2. This suggests that the usable delay spread for FTL may be less than 3.7 μs if the third sector (in a base station's multiple sector/cell coverage) creates a strong image for the desired signal. Empirically, for steady state where the residual frequency error is around 100-200 Hz, the impact of the image from the third sector is very small (~30 dB attenuation).

The same procedure demonstrated above for P1 can also be applied to the two RS symbols for P2. Here the staggered frequency response becomes $$H_{1,2} = B(d_{0,1}, f_e) \underbrace{[H[0]A(f_e), H[3]A(f_e), H[6]A(f_e), H[9]A(f_e) \ldots]^T}_{Q_1} \odot \underbrace{[B(d_{1,2}, f_e), 1, B(d_{1,2}, f_e), 1, \ldots]^T}_{Q_3}$$

The IDFT/IFFT of this $Q_2$ becomes $$q_2[n] = \begin{cases} \frac{\sqrt{M}}{2}(1 + B(d_{1,2}, f_e)) & n = 0 \\ -\frac{\sqrt{M}}{2}(1 - B(d_{1,2}, f_e)) & n = \frac{M}{2} \\ 0 & \text{else.} \end{cases}$$

Several observations are made:

There is an additional phase shift $B(d_{0,1}, f_e)$ in $H_{1,2}$ relative to $H_{0,1}$.

This phase shift can be used to estimate the frequency error $f_e$.

$q_2[n]$ and $q_1[n]$ have different impulse response characteristics at time M/2. Specifically, there is a sign flip with $q_2[n]$ (arising from the B phase difference for the P2 pairing as compared to the P1 pairing).

The FTL pull-in range is limited by $d_{0,1}$ and $d_{1,2}$.

Discriminator

Using the above relationships and Figs., an understanding of when the FTL will be inaccurate (for example, image signal is greater than desired signal) can be obtained. Therefore, a discriminator can be developed for adjudicating when/how to rely on the FTL or when not to rely on it. The discrimination should be performed by the UE (though it may be possible in some instances to offload this task). For example, for each sub-frame, the UE could calculate:

Dot product between the complex conjugate of the IFFT of $H_{0,1}$ (from P1) and the IFFT of $H_{1,2}$ (from P2). (this would generate the overall frequency error terms)
  i. A threshold may be used to select the number of taps for the dot-product.

Dot product between the complex conjugate of the IFFT of $H_{1,2}$ and the IFFT of $H_{2,3}$, and so forth.

The UE may sum up those products over different Tx-Rx antenna pairs taking into account the time difference $d_{0,1}$ and $d_{1,2}$. Of course, other time differences and pairing may arise than described herein, however, a similar analysis to what has been shown can be applied to arrive at the same general result.

Case Study: Single Path Channel and Single Tx Antenna

For the case of using CIR including image, the channel is flat over frequency. Ignoring the interference and noise, the relevant responses are:

$$h_{0,1}[n] =$$
$$IFFT(H_{0,1}) = N_p \sqrt{E} \left[ (1 + B(d_{0,1}, f_e))\delta[n] + (1 - B(d_{0,1}, f_e))\delta\left[n - \frac{M}{2}\right] \right]$$

and $$h_{1,2}[n] = IFFT(H_{1,2}) =$$
$$N_p \sqrt{E} \, B(d_{0,1}, f_e) \left[ (1 + B(d_{1,2}, f_e))\delta[n] - (1 - B(d_{1,2}, f_e))\delta\left[n - \frac{M}{2}\right] \right]$$

By applying a cross product (elevated *) and summing appropriately, the above relationships can be simplified to:

$$\sum_{n=0}^{M-1} h_{0,1}[n]^* h_{1,2}[n] = EN_p^2 B(d_{0,1}, f_e)[(1 + B^*(d_{0,1}, f_e))(1 + B(d_{1,2}, f_e)) -$$
$$(1 - B^*(d_{0,1}, f_e))(1 - B(d_{1,2}, f_e))] =$$
$$2EN_p^2 B(d_{0,1}, f_e)(B(d_{1,2}, f_e) + B^*(d_{0,1}, f_e)) = 2EN_p^2 \left( e^{j2\pi(d_{0,1} + d_{1,2})f_e/N} + 1 \right)$$

Then, applying the above approach over one sub-frame, a phasor like closed expression $Z(f_e)$ for the frequency error can be arrived at:

$$Z(f_e) = \sum_{n=0}^{M-1} h_{0,1}[n]^* h_{1,2}[n] + \sum_{n=0}^{M-1} h_{1,2}[n]^* h_{2,3}[n] = \quad (2)$$
$$4EN_p^2 \left( e^{j2\pi(d_{0,1} + d_{1,2})f_e/N} + 1 \right) =$$
$$2E(2N_p)^2 \cos(\pi(d_{0,1} + d_{1,2})f_e/N) e^{j\pi(d_{0,1} + d_{1,2})f_e/N}$$

Thus, by applying simple phasor identities, the estimated frequency error is approximately $$\tilde{f}_e = \frac{N * \text{atan}(Z(f_e))}{2\pi \frac{d_{0,1} + d_{1,2}}{2}} \quad (3)$$

Note that even though for short CP, $d_{0,1} \neq d_{1,2}$, Eq. (3) suggests that the arithmetical mean of $d_{0,1}$ and $d_{1,2}$ determines the pull-in range. Note that due to the expression $\cos(\pi(d_{0,1}+d_{1,2})f_e/N)$ in Eq. (2), the signal strength goes to zero (null) when $f_e$ is 1 kHz.

Taking into consideration the 1 kHz null, when using a truncated CIR (for example, using only the first tap, i.e., n=0 only, ignoring the n=M/2 tap) the resulting discriminator output is $$Z(f_e) = 2EN_p^2(e^{j2\pi d_{0,1}f_e/N} + 1)(e^{j2\pi d_{1,2}f_e/N} + 1) =$$
$$2E(2N_p)^2 \cos(\pi d_{0,1}f_e/N)\cos(\pi d_{1,2}f_e/N)e^{j\pi(d_{0,1}+d_{1,2})f_e/N}.$$

The estimated frequency error is still the same as in Eq. (3) but the signal strength goes to zero much later than in Eq. (2) which means a larger pull-in range in this case, i.e., ~1.66 kHz. Therefore, the FTL can be considered to be reliable if the frequency error does not exceed 1.66 kHz.

Based on the above, several simulations were performed. FIGS. 11-14 show the results of these several simulations with different TU's (typical urban channel model). Specifically, the bias and variance of the residual frequency error are illustrated, given the following additional assumptions:

There are three staggered CIRs in each sub-frame.
There is no RS staggering across sub-frames.
A single Tx and two Rx antennas are assumed.
Initial frequency error is 1 kHz.
Time tracking loop is off
One cell is considered.

Figure 11:
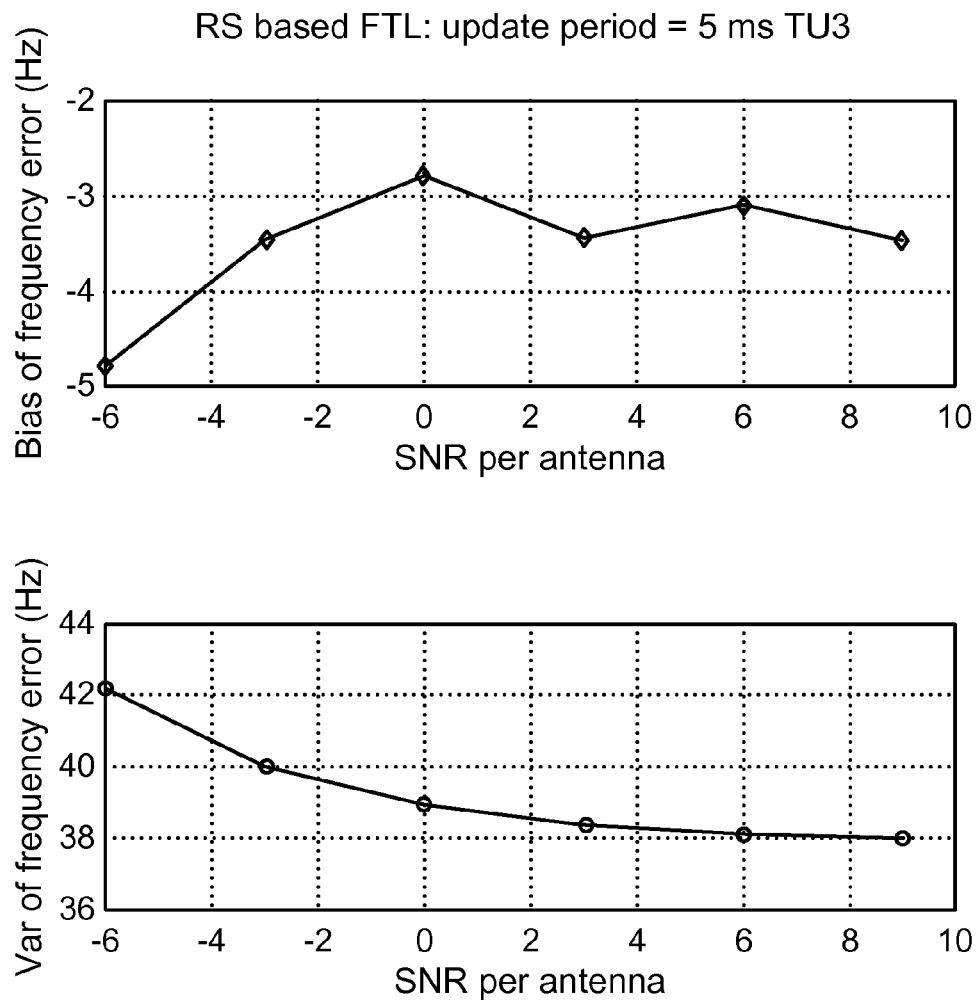
FIGS. 11-14 are plots showing error values for differing TU's and bandwidths.
Figure 12:
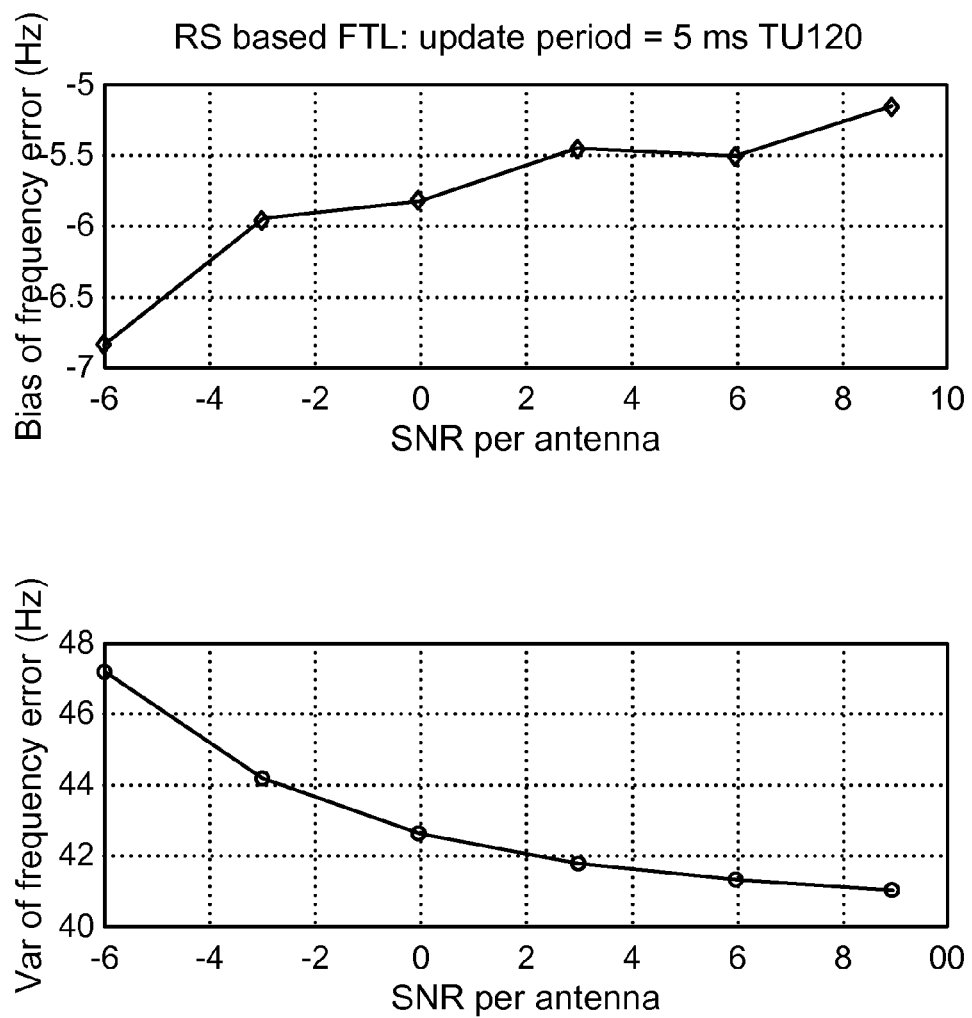
Figure 13:
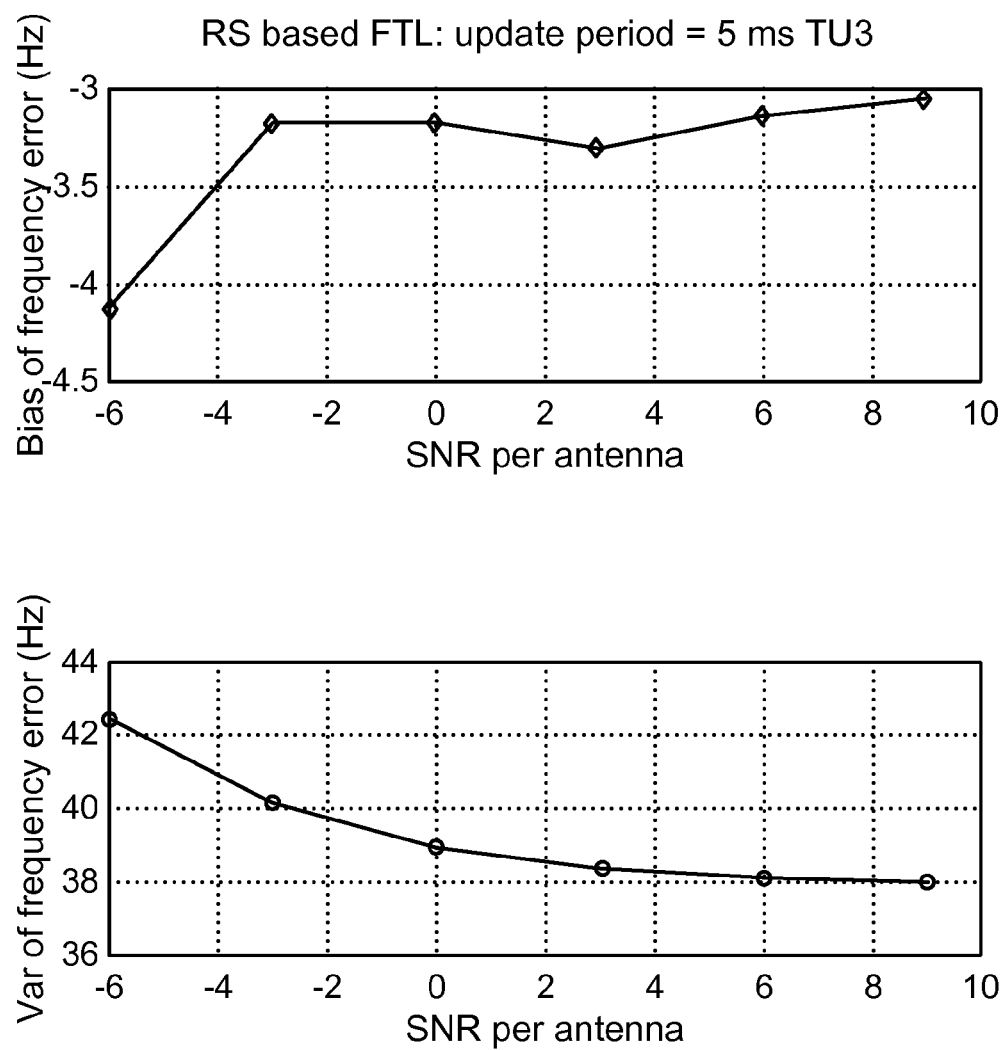
Figure 14:
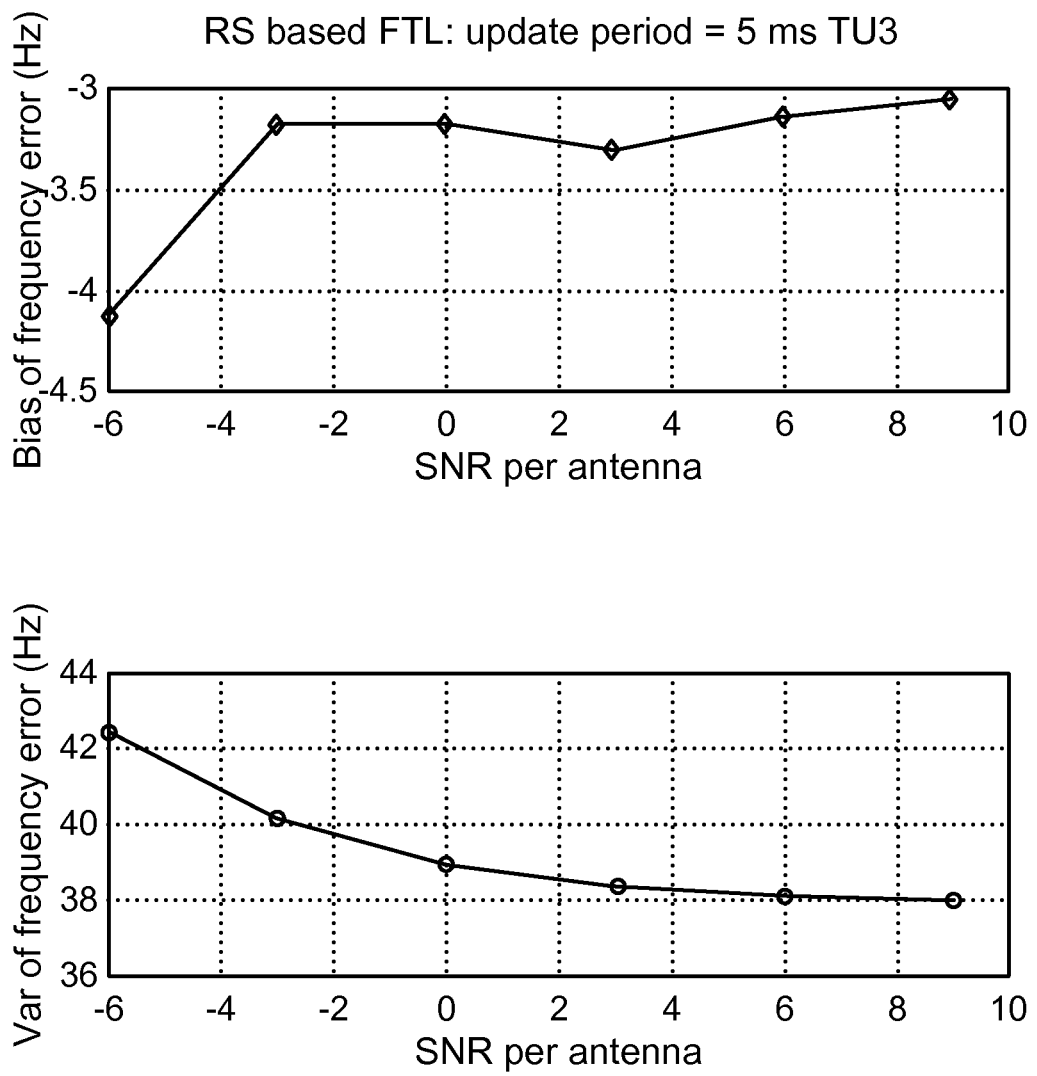

FIGS. 11-12 depict the results for a small system bandwidth (2.5 MHz) and FIGS. 13-14 depict the results for a large system bandwidth (10 MHz). It can be observed that the bias is close to zero and the variance is well below the targeted residual frequency error, i.e., 150 Hz. The resulting time constant is defined as the time it takes the FTL to reach 1/e of the initial frequency error, which is 5 ms for the range of SNRs that have been considered.

Pilot Tones—SSC Based FTL

In systems using a 3GPP methodology (for example, LTE), when the UE is initially turned on, system timing with the base station or AE is acquired (among other things) via the Primary Synchronization Channel (PSC) and the Secondary Synchronization Channel (SSC) which are included in the downlink link channel. The PSC is used for the UE to acquire slot sync, and the SSC is used for the UE to acquire a 10 msec frame boundary and a long pseudo random (PN) scrambling code group ID. The 10 msec frames contain the PSC and SSC. The nature of the SSC is that it is composed of a series of RS tones that are contiguous in the underlying tile structure. That is, there is no staggering since user data is not being transmitted yet and initial sync is being attempted.

Because the SSC tones are contiguous within the tile structure, the channel estimation can be performed using the SSC tones and, if desired, within one sub-frame. Channel estimation and FTL control can be obtained in many ways, however a very simple SSC tone approach using the principles presented above is described below. Because there are a myriad of SSC based channel estimation approaches, the use of SSC based channel estimation in this disclosure is not limited to the approach presented herein as other approaches may be used without departing from the spirit and scope of this invention.

Generally speaking, the frequency domain response g[k] of the channel response H subject to the input signal g[k] can be "broken into pieces" with a portion of it operated on by a portion of the frequency domain response of the SSC tones, also "broken into pieces." That is, referring back to Eqs. (1), (2) and (3), a procedure akin to the conjugate summation can be used to create a frequency error function Z by using either a portion of the g[k] and s[k] functions (in some cases it may be desirable to use an entire function or, just half of a copy of the function values). In the case of a half copy operation (for example, using N=63, k=N/2), an approximation of a frequency error function $z_1$ for the first portion of the g(k) and s(k) functions can be arrived at by defining $$z_1 = \sum_{k=0}^{31} g^*(k)s(k)$$

while the second portion $z_2$ can be arrived at by defining $$z_2 \sum_{k=32}^{63} g^*(k)s(k).$$

Performing the operation of $z_1^* \cdot z_2$ will extract the frequency error value $f_e$, which can be used for FTL assessment and control.

Figure 15:
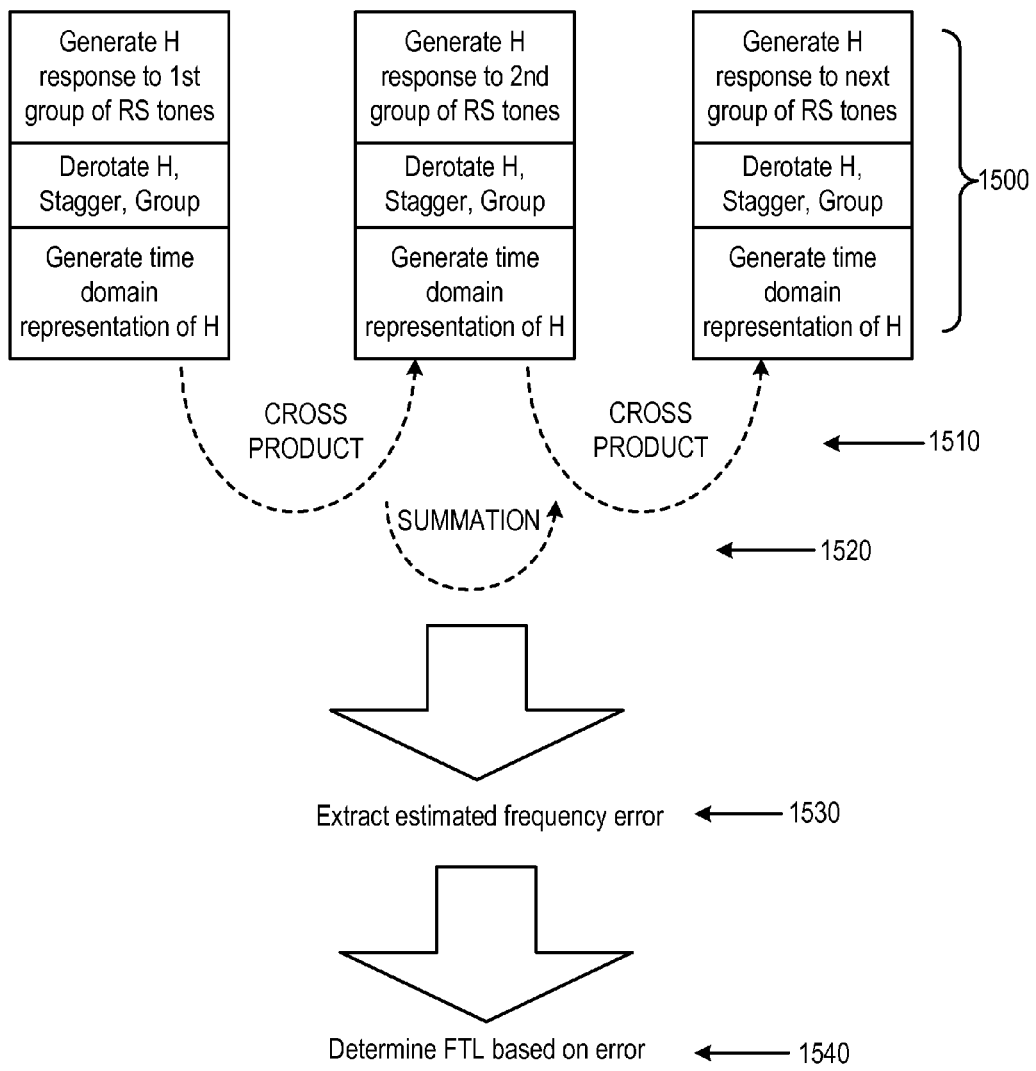
FIG. 15 is an outline of an exemplary process for deriving and utilizing the frequency error from RS tones.

FIG. 15 is an outline of an exemplary process for deriving and utilizing the frequency error from RS tones, as detailed by the equations provided above. Based on the explanations provided above, a system response (H) is generated 1500 for each group of RS tones (it may not be necessary to perform this for all the groups of RS tones in the tile structure, as a sufficient degree of channel estimation may be accomplished with a subset of the RS tones). With the H responses for the "respective" RS tone groups, they can be transformed into the time domain. The time domain expression is then cross-producted 1510 with the time domain expression from the "next" group of RS tones. The expressions are also summed 1520 across the time domain interval of interest. Next, an expression for the estimated frequency error can be extracted 1530 or simplified from the process of 1520, by any one of simple grouping of terms or series truncation, and so forth. The resulting error expression can be of complex form, allowing it to be expressed as a phase error component. This phase value can be quantified for FTL control 1540 and decision making.

It should be understood that FIG. 15 is presented as a general overview of various steps that are detailed in the equations provided above. Therefore, one of ordinary skill in the mathematical arts may change or modify the manner and order of operations as well as add additional operations, as desired, without departing from the spirit and scope of the subject matter of this disclosure.

For example, one approach that is analogous to the one(s) described above could be summarized as follows: The UE applies an FFT to the received signal (S1) in the time domain, where the S1 signal contains both the data and pilot tones. The UE separates the pilot tones and data tones in the frequency domain. The UE uses the frequency domain pilot tones to estimate the time domain CIR. The UE may stagger pilot tones from different time instances. The UE applies IDFT/IFFT operations to convert the frequency domain channel response to the time domain CIR. The resulting CIR can also be used to drive timing tracking algorithms. The CIR also can be further filtered in time or frequency for data tone demodulation and/or decoding. The UE can select "N1" taps among the CIRs, by choosing the strongest taps or the strongest tap and the next closest tap. The UE can apply the above procedures to different S2 signals, where the S2 signal can be separated from the S1 signal by a known time difference T1. The UE can obtain another different set of taps N2 from the S2 CIR. The UE can choose a set of taps from the two signals CIRs and apply a differential product to those pairs (complex conjugate). These products can be summed. The UE estimates frequency offset by using the summed results and the known time difference between S1 and S2 (e.g., T1). This procedure can be replicated for additional signals S3, S4, etc. Because of different time differences (T2 versus T1) in the different signals, scaling can be performed on the sum of the differential results, before combining and estimating the frequency.

With respect SSC based FTL, simulations have shown that the SSC FTL pull in range is in the order of 15 kHz with a larger SNR value than that obtained with the CIR FTL approach. Because of the tradeoffs between the pull in ranges and the SNR between both approaches, a discriminator or FTL algorithm that decides which approach to use is proposed.

As one possible example, during initial acquisition the frequency offset is large, therefore the FTL algorithms can be integrated having a specified decision logic. For example using either the SSC-based FTL (being aware of the pull range limit—in this case 15 kHz) or the CIR-based FTL, the UE may switch between CIR-based FTL and SSC-based FTL.

Figure 16:
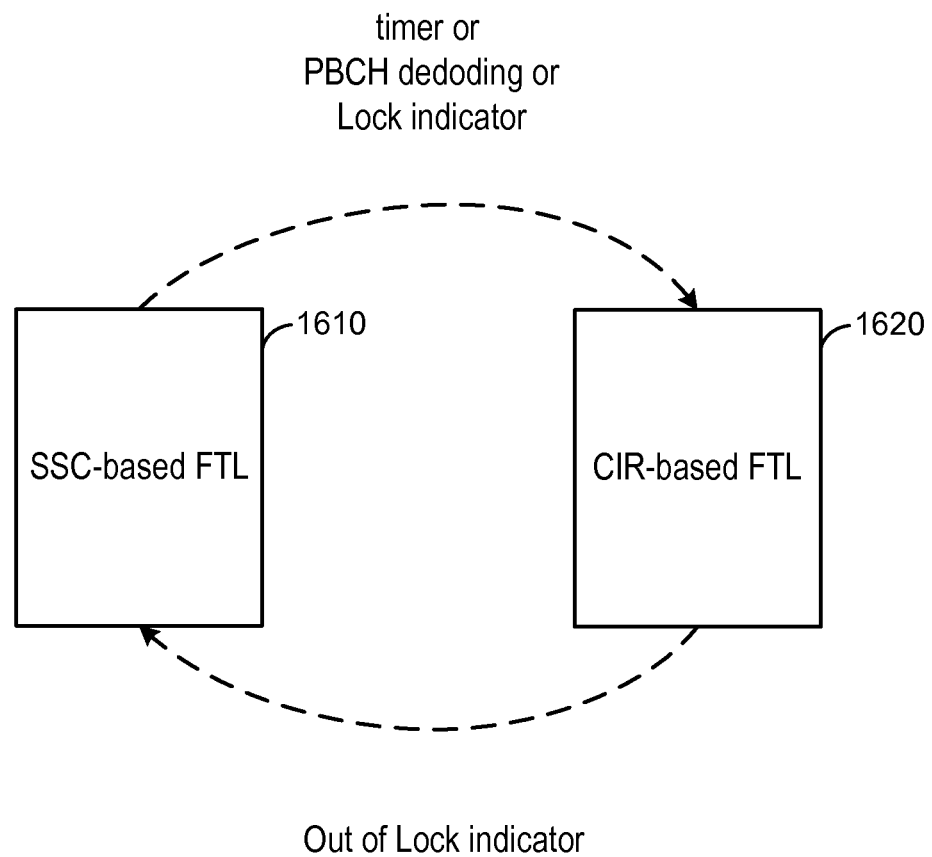
FIG. 16 is a depiction of one possible logic flow of switching between the SSC and CIR based FTL.

FIG. 16 provides a depiction of one possible logic flow of switching between the SSC and CIR based FTL, and is briefly summarized as:

During initial acquisition, the UE can use SSC-based FTL 1610, then switch to CIR-based FTL 1620. The switching may be triggered by any one or more of the following:
1. timer
2. after decoding PBCH
3. combination of using a timer and decoding PBCH After initial acquisition and while in steady state mode, the UE may switch from CIR-based FTL 1620 to SSC-based FTL 1610 if the UE detects a large frequency error. Alternatively, if there a failed lock indicator, the same approach may be used.

Figure 17:
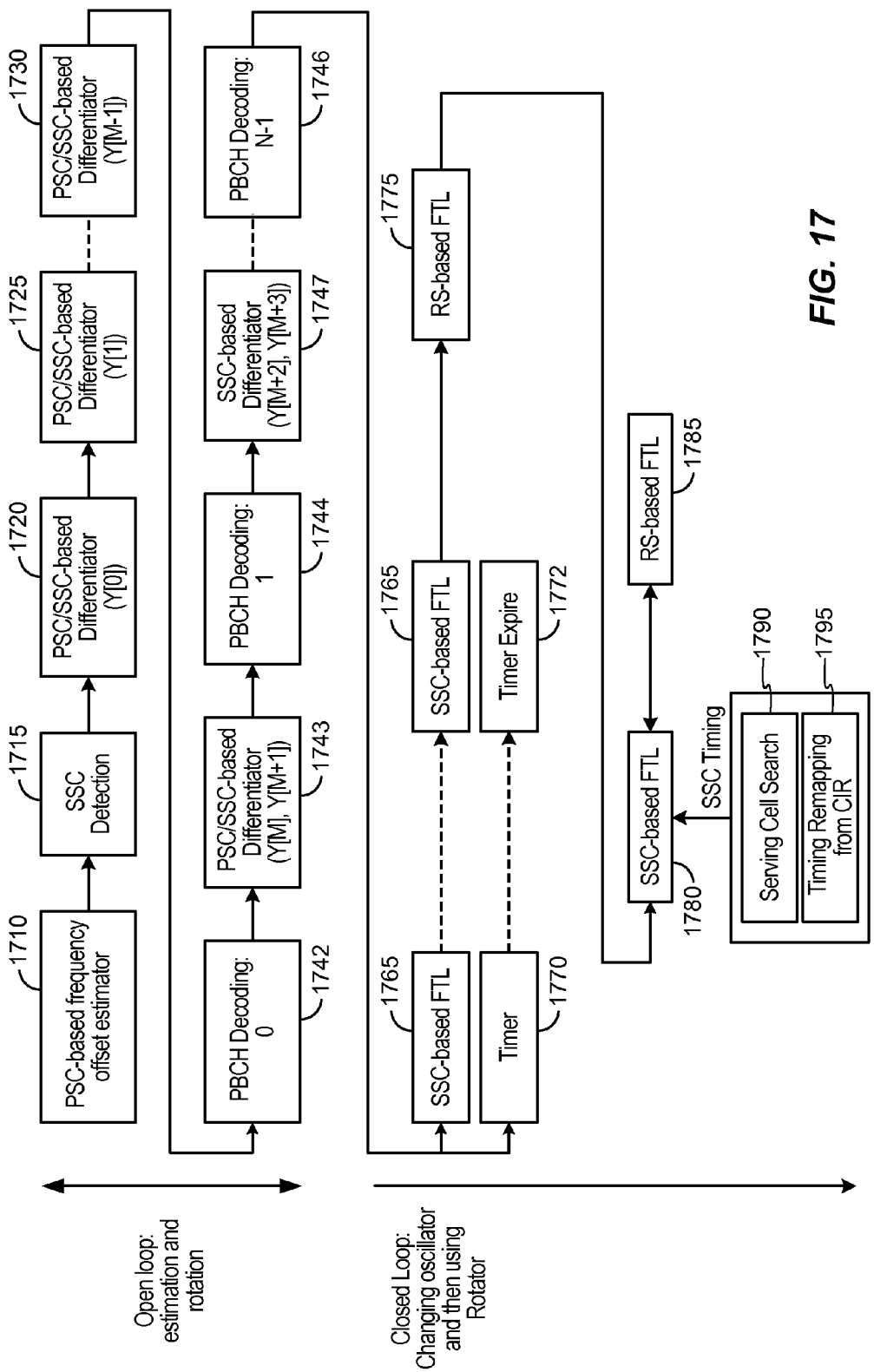
FIG. 17 illustrates another exemplary logic flow switching between SSC and CIR based FTT.

FIG. 17 illustrates another logic flow switching between SSC and CIR based FTL, in the context of an overall frequency correction scheme starting from initial acquisition. During open loop estimation and rotation, the PSC-based estimator 1710 gives an initial frequency offset estimation before SSC detection 1715. After SSC detection 1715, the UE uses the detected SSC for frequency offset estimation. For each additional PBCH data interval (for example, 10 ms), the UE can update the frequency offset estimation by using the SSC signal present in each radio frame (1720, 1725, 1730). After initiating the decoding of the PBCH 1742, the UE can use the PSC/SSC-based differentiators 1743, 1747 with the PBCH decoding 1742, 1744, 1746 to generate an estimated frequency offset to adjust the oscillator, i.e., starting closed loop frequency offset adjustment.

The closed loop frequency offset adjustment procedure (still in closed loop SSC-mode 1765) may implement a timer 1770 such that the frequency error is small before switching to RS-based FTL 1775. After the timer 1772 expires, the UE can switch to RS-based FTL 1775, if so desired. Subsequently, the UE may switch back to SSC-based FTL 1780 or vice versus to RS-based FTL 1785, for example, if it detects a large frequency error, as discussed above with respect to FIG. 15. It is worth noting that the closed loop timing for the SSC-based FTL 1780 may be derived from several sources, such as from the latest serving cell search results 1790 and/or from the timing remapping 1795 since the system bandwidth may be larger than the bandwidth occupied by the SSC. As should be apparent, several other options or modes of implementation may be contemplated in view of the disclosed embodiments, including multiple timers, varying thresholds and so forth. Therefore, changes may be made to the various embodiments described without departing from the spirit and scope herein.

Several advantages of the various embodiments and methods described above can be obtained. For example, in some embodiments, the above approaches provide a very low complexity method for separating the channel impulse response from the pilot and data. In contrast, the traditional approach for separating frequency domain multiplexed pilot and data signals is to apply a filter to the time domain. If, however, the pilot tone is not uniformly placed in the frequency domain or the frequency domain placement varies from time to time, this traditional domain filtering approach may be too complex to implement.

Another advantage of the exemplary embodiments is that the obtained CIR may be efficiently reused for various other building blocks in UE signal processing. For example, the CIR may be used in the time tracking loop, for frequency offset estimation/tracking, for data demodulation or decoding, and so forth.

Figure 18:
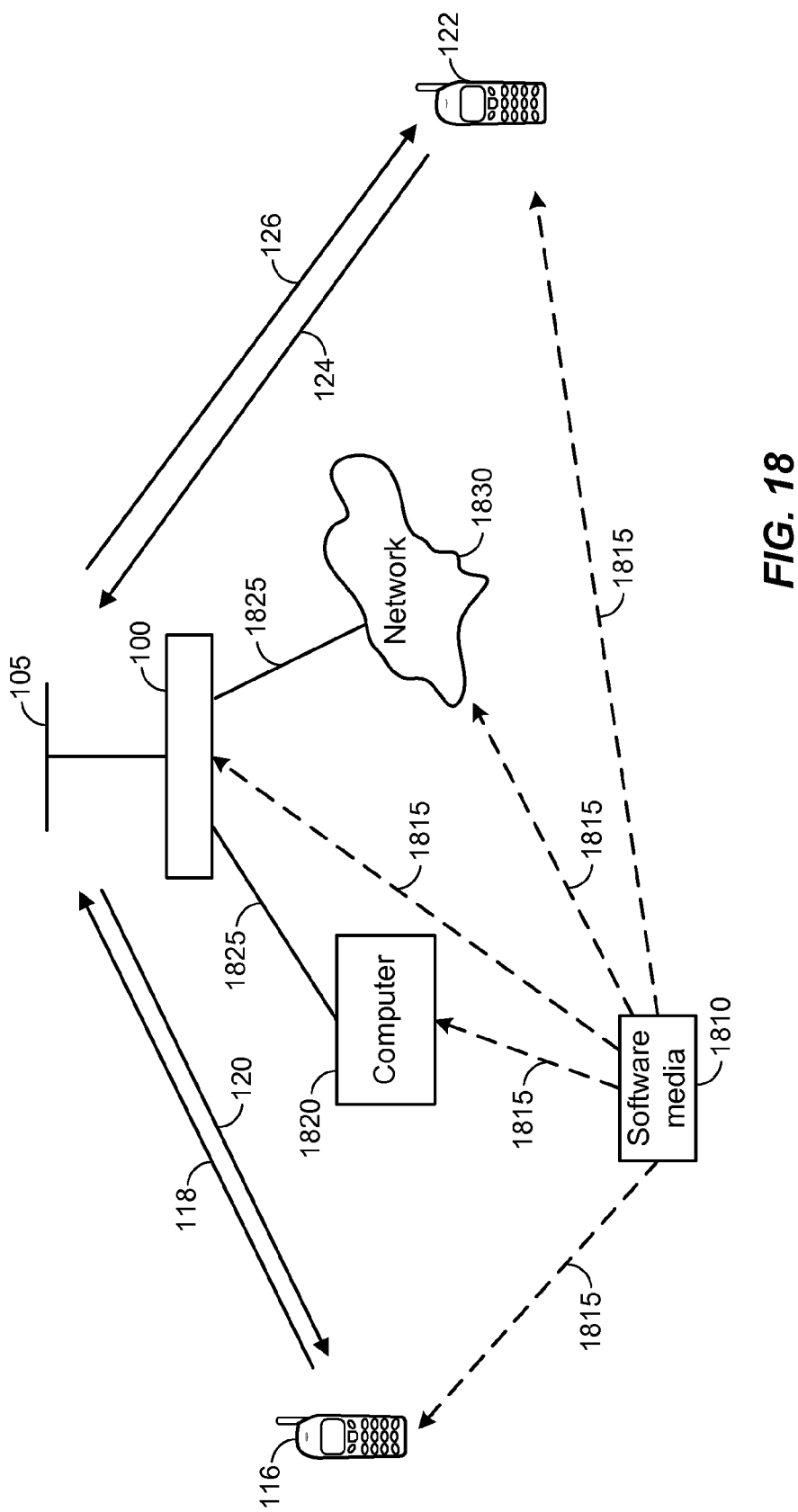
FIG. 18 depicts a possible software implementation in hardware systems.

FIG. 18 depicts one possible configuration for implementing the processes described, using as one example software instructions coded onto a media. FIG. 18 shows antenna(s) 105 on access point 100 which transmits and receives to access terminals 116, 122 via wireless downlinks 120, 126 and wireless uplinks 118, 124. Software 1810 containing instructions for the above-described processes can be uploaded or incorporated either in part or in whole to the access point 100, access terminals/UEs 116, 122, computer 1820, and/or network 1830 (that is connected to the access point 100 via communication channel(s) 1825) using any one of communication links 1815, to arrive at the access terminals 116, 122. The software instructions can also be coded into memory resident on the access terminals 116, 122, as possibly RAM, ROM, programmable memory or any available mechanism for encoding instructions for use by a processor. The various methods and systems described herein may be applicable to LTE, UMB, and other protocols that require frequency synchronization between receiving units.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in the access terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for channel estimation using received reference signal (RS) tones in a mobile communications system, comprising:
   generating frequency domain response expressions (H) for at least one or more sets of RS tones in a communication channel;
   derotating H by a complex conjugate of the RS tones;
   combining the frequency domain response expressions to form a staggered frequency domain response expression ($H_{a,b}$) of the one or more sets of RS tones;
   grouping terms of the staggered frequency domain response expression into desired signals $A(f_e)$ and phase signals $B(d,f_e)$, where $f_e$ represents frequency error and d represents a number of chips between RS tones;
   converting the staggered frequency domain response expression into a time domain expression ($h_{a,b}$);
   generating an error function $Z(f_e)$ from the time domain expression ($h_{a,b}$) by applying a cross product between different pairs of RS tone groups ($H_{a,b}$, $H_{b,c}$, etc.) and summing terms;
   estimating a frequency error $f_e$ from the error function $Z(f_e)$; and
   adjusting a discriminator in a mobile device based on the estimated frequency error for enhanced frequency tracking.

2. The method of claim 1, wherein the RS tones are sourced from several antennas.

3. The method of claim 1, wherein the time domain expression is an estimated channel impulse response (CIR).

4. The method of claim 1, wherein the RS tones are acquired from a Secondary Synchronization Channel (SSC).

5. The method of claim 1, further comprising:
   evaluating a ratio of a signal strength to image strength; and
   determining a threshold frequency error value.

6. The method of claim 1, wherein the RS tones utilize a short cyclic prefix (CP).

7. The method of claim 1, wherein the RS tones utilize a long cyclic prefix (CP).

8. The method of claim 1, wherein the discriminator switches between a channel impulse response (CIR) based frequency tracking loop to a secondary synchronization channel (SSC) frequency tracking loop.

9. The method of claim 8, wherein the switching is initiated by a timer.

10. The method of claim 8, wherein the switching is initiated after decoding a physical broadcast channel (PBCH).

11. The method of claim 8, wherein the switching is initiated upon an out of lock indication.

12. The method of claim 8, wherein the discriminator switches from a secondary synchronization channel (SSC) based frequency error estimation to groups of RS based frequency error estimation.

13. The method of claim 4, wherein a Primary Synchronization Channel (PSC) and the Secondary Synchronization Channel (SSC) based differentiator is utilized.

14. An apparatus for channel estimation using received reference signal (RS) tones in a mobile communications system, comprising:
   means for generating frequency domain response expressions (H) for at least one or more sets of RS tones in a communication channel;
   means for derotating H by a complex conjugate of the RS tones;
   means for combining the frequency domain response expressions to form a staggered frequency domain response expression ($H_{a,b}$) of the one or more sets of RS tones;
   means for grouping terms of the staggered frequency domain response expression into desired signals $A(f_e)$ and phase signals $B(d,f_e)$, where $f_e$ represents frequency error and d represents a number of chips between RS tones;
   means for converting the staggered frequency domain response expression into a time domain expression ($h_{a,b}$);
   means for generating an error function $Z(f_e)$ from the time domain expression ($h_{a,b}$) by applying a cross product between different pairs of RS tone groups ($H_{a,b}$, $H_{b,c}$, etc.) and summing terms;

means for estimating a frequency error $f_e$ from the error function $Z(f_e)$; and means for adjusting a discriminator in a mobile device based on the estimated frequency error for enhanced frequency tracking.

15. The apparatus of claim 14, wherein the RS tones are sourced from several antennas.

16. The apparatus of claim 14, wherein the time domain expression is an estimated channel impulse response (CIR).

17. The apparatus of claim 14, wherein the RS tones are acquired from a Secondary Synchronization Channel (SSC).

18. The apparatus of claim 14, further comprising:

means for evaluating a ratio of a signal strength to image strength; and means for determining a threshold frequency error value.

19. The apparatus of claim 14, wherein the means for adjusting a discriminator switches between a channel impulse response (CIR) based frequency tracking loop to a secondary synchronization channel (SSC) frequency tracking loop.

20. The apparatus of claim 19, wherein the switching is initiated by a timer.

21. The apparatus of claim 19, wherein the switching is initiated after decoding a physical broadcast channel (PBCH).

22. The apparatus of claim 19, wherein the switching is initiated upon an out of lock indication.

23. The apparatus of claim 19, wherein the means for adjusting the discriminator switches from a secondary synchronization channel (SSC) based frequency error estimation to groups of RS based frequency error estimation.

24. The apparatus of claim 19, wherein a Primary Synchronization Channel (PSC) and the Secondary Synchronization Channel (SSC) based differentiator is utilized.

25. A computer program product comprising:

a non-transitory computer-readable medium comprising:

code for generating frequency domain response expressions (H) for at least one or more sets of reference signal (RS) tones received in a communication channel in a mobile communications system for channel estimation;

code for derotating H by a complex conjugate of the RS tones;

code for combining the frequency domain response expressions to form a staggered frequency domain response expression ($H_{a,b}$) of the one or more sets of RS tones;

code for grouping terms of the staggered frequency domain response expression into desired signals $A(f_e)$ and phase signals $B(d,f_e)$, where $f_e$ represents frequency error and d represents a number of chips between RS tones;

code for converting the staggered frequency domain response expression into a time domain expression ($h_{a,b}$);

code for generating an error function $Z(f_e)$ from the time domain expression ($h_{a,b}$) by applying a cross product between different pairs of RS tone groups ($H_{a,b}$, $H_{b,c}$, etc.) and summing terms;

code for estimating a frequency error $f_e$ from the error function $Z(f_e)$; and code for adjusting a discriminator in a mobile device based on the estimated frequency error for enhanced frequency tracking.

26. The computer program product of claim 25, wherein the RS tones are sourced from several antennas.

27. The computer program product of claim 25, wherein the time domain expression is an estimated channel impulse response (CIR).

28. The computer program product of claim 25, wherein the RS tones are acquired from a Secondary Synchronization Channel (SSC).

29. The computer program product of claim 25, the computer-readable medium further comprising:

code for evaluating a ratio of a signal strength to image strength; and code for determining a threshold frequency error value.

30. The computer program product of claim 25, wherein the RS tones utilize a short cyclic prefix (CP).

31. The computer program product of claim 25, wherein the RS tones utilize a long cyclic prefix (CP).

32. The computer program product of claim 25, wherein the discriminator switches between a channel impulse response (CIR) based frequency tracking loop to a secondary synchronization channel (SSC) frequency tracking loop.

33. The computer program product of claim 32, wherein the switching is initiated by a timer.

34. The computer program product of claim 32, wherein the switching is initiated after decoding a physical broadcast channel (PBCH).

35. The computer program product of claim 32, wherein the switching is initiated upon an out of lock indication.

36. The computer program product of claim 32, wherein the discriminator switches from a secondary synchronization channel (SSC) based frequency error estimation to groups of RS based frequency error estimation.

37. The computer program product of claim 28, wherein a Primary Synchronization Channel (PSC) and the Secondary Synchronization Channel (SSC) based differentiator is utilized.

38. An apparatus for channel estimation using received reference signal (RS) tones in a mobile communications system, comprising:

a processor, configured to control operations for:

generating frequency domain response expressions (H) for at least one or more sets of RS tones in a communication channel;

derotaing H by a complex conjugate of the RS tones;

combining the frequency domain response expressions to form a staggered frequency domain response expression ($H_{a,b}$) of the one or more sets of RS tones;

grouping terms of the staggered frequency domain response expression into desired signals $A(f_e)$ and phase signals $B(d,f_e)$, where $f_e$ represents frequency error and d represents a number of chips between RS tones;

converting the staggered frequency domain response expression into a time domain expression ($h_{a,b}$);

generating an error function $Z(f_e)$ from the time domain expression ($h_{a,b}$) by applying a cross product between different pairs of RS tone groups ($H_{a,b}$, $H_{b,c}$, etc.) and summing terms;

estimating a frequency error $f_e$ from the error function $Z(f_e)$;

adjusting a discriminator in a mobile device based on the estimated frequency error for enhanced frequency tracking; and a memory coupled to the processor for storing data.

39. The apparatus of claim 38, the processor further configured to control operations for:

evaluating a ratio of a signal strength to image strength; and determining a threshold frequency error value.

40. The apparatus of claim 38, wherein the discriminator switches between a channel impulse response (CIR) based frequency tracking loop to a secondary synchronization channel (SSC) frequency tracking loop.

41. The apparatus of claim 38, wherein the switching is initiated by a timer.

42. The apparatus of claim 38, wherein the discriminator switches from a secondary synchronization channel (SSC) based frequency error estimation to groups of RS based frequency error estimation.

* * * * *